(12) United States Patent
Buerkett et al.

(10) Patent No.: US 12,365,278 B2
(45) Date of Patent: Jul. 22, 2025

(54) CONTAINER CARRIER AND DUMPING PALLET

(71) Applicant: Kress Corporation, Brimfield, IL (US)

(72) Inventors: Noah K. Buerkett, Metamora, IL (US); Danny w. Boettcher, Brimfield, IL (US); Clint M. Summers, Hanna City, IL (US)

(73) Assignee: Kress Corporation, Brimfield, IL (US)

( * ) Notice: Subject to any disclaimer, the term of this patent is extended or adjusted under 35 U.S.C. 154(b) by 314 days.

(21) Appl. No.: 17/919,208

(22) PCT Filed: Apr. 16, 2021

(86) PCT No.: PCT/US2021/027764
§ 371 (c)(1),
(2) Date: Oct. 14, 2022

(87) PCT Pub. No.: WO2021/212027
PCT Pub. Date: Oct. 21, 2021

(65) Prior Publication Data
US 2023/0347806 A1    Nov. 2, 2023

Related U.S. Application Data

(63) Continuation of application No. 16/850,637, filed on Apr. 16, 2020, now Pat. No. 11,198,384.

(51) Int. Cl.
*B60P 1/28* (2006.01)
*B62D 53/02* (2006.01)
*B65G 67/30* (2006.01)

(52) U.S. Cl.
CPC ............... *B60P 1/28* (2013.01); *B62D 53/02* (2013.01); *B65G 67/30* (2013.01)

(58) Field of Classification Search
CPC ............ B60P 1/30; B62D 53/02; B65G 67/30
See application file for complete search history.

(56) References Cited

U.S. PATENT DOCUMENTS 2,278,446 A   4/1942   Hutchinson
3,083,850 A   4/1963   Owen
(Continued)

FOREIGN PATENT DOCUMENTS

JP    S61-193941     8/1996
WO    WO 2021/212027    10/2021

OTHER PUBLICATIONS

United States Patent Office, International Search Report in International Patent Application No. PCT/US2021/0247764, 2 pp. (Jul. 14, 2021).
(Continued)

*Primary Examiner* — Jonathan Snelting
(74) *Attorney, Agent, or Firm* — Leydig, Voit & Mayer, Ltd.

(57) ABSTRACT

A pallet for supporting a container includes a base, plurality of supports secured with the base, first platform rotatably supported on the base, and second platform pivotably coupled to the first platform and adapted to support the container. At least one pallet linkage arrangement couples the second platform and the first platform, and at least one pallet actuator pivots the second platform between container transport and dump positions. A carrier includes a prime mover, trailer, plurality of ground engaging members, at least one carrier actuator adapted to move at least a portion of the trailer between lowered and raised support positions relative to at least a portion of the plurality of ground engaging members. At least a portion of the trailer is sized to be received between the plurality of supports secured with the base of the pallet.

30 Claims, 28 Drawing Sheets

(56) References Cited

U.S. PATENT DOCUMENTS

| | | | |
|---|---|---|---|
| 3,096,894 | A | 7/1963 | Proler et al. |
| 3,266,648 | A | 8/1966 | Hackett et al. |
| 3,362,552 | A | 1/1968 | Thiele |
| 3,944,284 | A | 3/1976 | Kent |
| 4,067,245 | A | 1/1978 | Santic et al. |
| 4,199,085 | A | 4/1980 | Watts et al. |
| 4,200,334 | A | 4/1980 | Lindholm |
| 4,618,307 | A | 10/1986 | Kress et al. |
| 5,011,362 | A | 4/1991 | Pijanowski |
| 5,040,849 | A | 8/1991 | Thomas et al. |
| 6,832,883 | B2 | 12/2004 | Pierce |
| 7,438,515 | B2 | 10/2008 | Barry |
| 8,152,432 | B2 | 4/2012 | Cooper |
| 2007/0128011 | A1 | 6/2007 | Buckley, III |
| 2016/0114388 | A1 | 4/2016 | Barnes |
| 2019/0031073 | A1* | 1/2019 | Ratcliffe ................. B60P 1/283 |

OTHER PUBLICATIONS

United States Patent Office, Written Opinion in International Patent Application No. PCT/US2021/0247764, 8 pp. (Jul. 14, 2021).
United States Patent Office, Preliminary Report on Patentability in International Patent Application No. PCT/US2021/0247764, 10 pp. (Oct. 27, 2022).

* cited by examiner

CONTAINER CARRIER AND DUMPING PALLET

CROSS-REFERENCE TO RELATED APPLICATIONS

This application is a national phase application of International Patent Application No. PCT/US2021/027764, filed Apr. 16, 2021, which claims priority to U.S. patent application Ser. No. 15/850,637, filed Apr. 16, 2020, and now issued as U.S. Pat. No. 11,198,384 issued Dec. 14, 2021, both of which are incorporated by reference herein in their entireties for all purposes.

TECHNICAL FIELD

This patent disclosure relates generally to heavy-duty carriers and more particularly concerns a carrier and a pallet for lifting, transporting and dumping a large load box, or the like.

BACKGROUND

In many heavy industries, it is desirable to employ large box-like containers for receiving and temporarily storing raw materials, intermediate products, or an apparatus for later processing or for subsequent delivery to other locations. Such containers may have a capacity of several dozen metric tons or even more and are often provided with integral legs or associated stands and frames for supporting the containers on the ground or plant floor both when the containers are empty and out of use and when they are filled and temporarily storing material. Often a heavy-duty carrier is provided for lifting and transporting such containers from place to place. In some industries, such a load box apparatus may be referred to as a tundish, which may be utilized to distribute and pour molten metal.

SUMMARY

The disclosure describes, in one aspect, a pallet for supporting a container on a surface. The pallet includes a base, a first platform, and a second platform. The base is supported by a plurality of supports secured with the base. The plurality of supports are spaced from one another and supporting the base in spaced relation to the surface. The first platform is disposed substantially parallel to and rotatably supported on the base. During rotation, the first platform is substantially parallel to the base. The second platform is adapted to support the container. The second platform is pivotably coupled to the first platform for movement between a container transport position and a container dump position. The second platform is coupled to the first platform by at least one pallet linkage arrangement. At least one pallet actuator disposed to pivot the second platform between the container transport position and the container dump position.

The disclosure describes in another aspect, an arrangement for transporting a container on a surface, and dumping the container. The arrangement includes a carrier and a pallet that is adapted to support the container. The pallet includes a base, a first platform, and a second platform. The base is supported by a plurality of supports secured with the base. The plurality of supports are spaced from one another and supporting the base in spaced relation to the surface. The first platform is rotatably supported on the base. The second platform is adapted to support the container. The second platform is pivotably coupled to the first platform for movement between a container transport position and a container dump position. The second platform is coupled to the first platform by at least one pallet linkage arrangement. At least one pallet actuator disposed to pivot the second platform between the container transport position and the container dump position. The carrier includes a trailer, a plurality of round engaging members, and a prime mover. The carrier further includes at least one carrier actuator adapted to move the trailer between a lowered position and a raised support position relative to at least a portion of the plurality of ground engaging members. The trailer sized to be received between the plurality of supports secured with the base.

BRIEF DESCRIPTION OF THE DRAWING(S)

DETAILED DESCRIPTION

Figure 1:
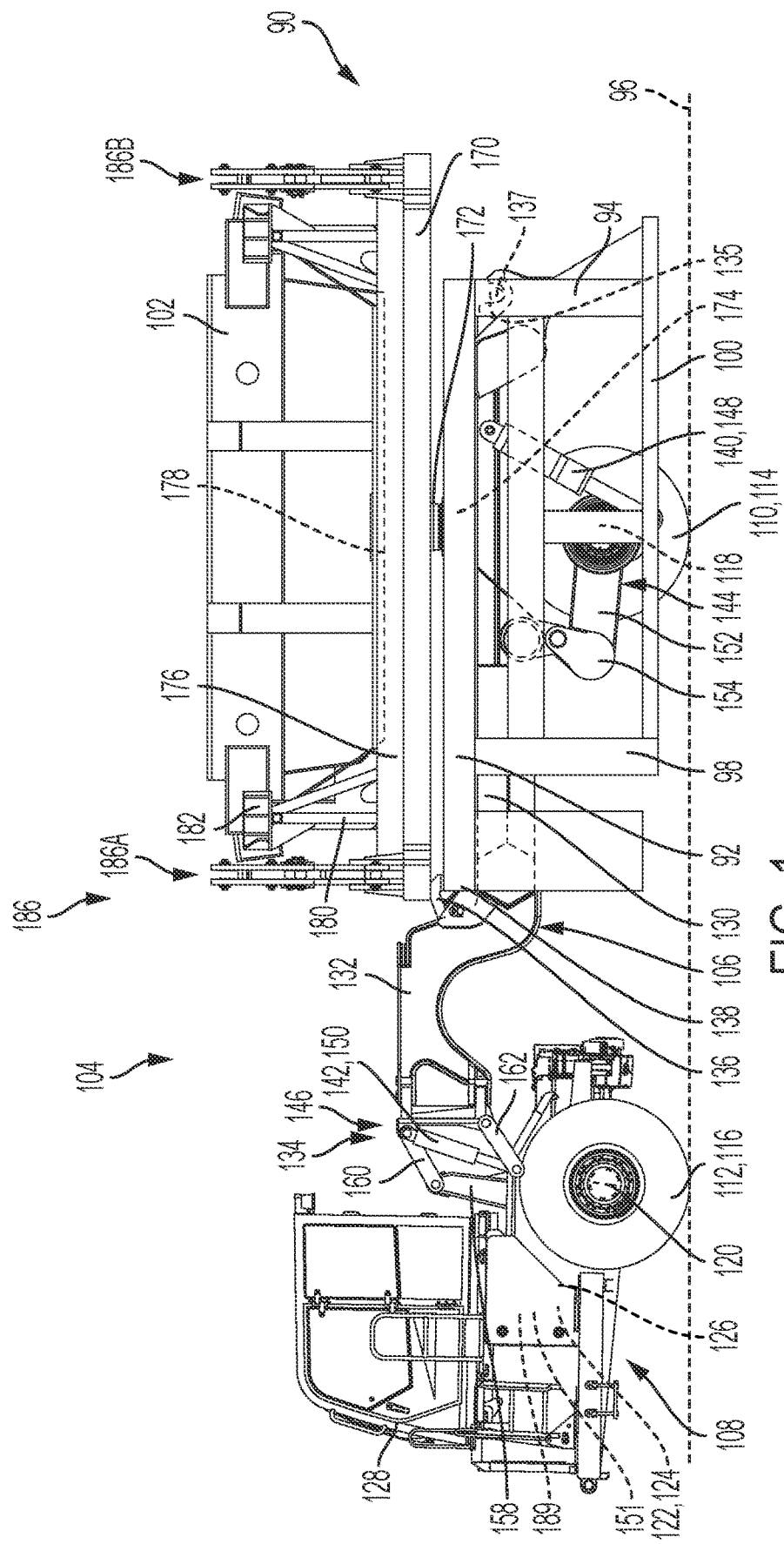
FIG. 1 is a side elevational view of a transporter, carrier, and dumping pallet according to teaching of this disclosure, the carrier being in a raised transport position.

Turning to FIG. 1, there is illustrated a pallet 90 for lifting and transporting, and optionally dumping, a large container 102, or the like, and a carrier 104 for transporting the pallet 90. In the embodiment of FIGS. 1-7, the illustrated container 102 is typically referred to as a tundish, and is typically utilized for transporting molten metal material. It will be appreciated, however, that a transported container 102 may be an alternative type of container, or be utilized for an alternative purpose.

The pallet 90 includes a base 92 supported by a plurality of supports 94 secured with the base 92. The plurality of supports 94 are spaced from one another and support the base 92 in spaced relation to a surface 96 (shown in broken lines in FIG. 1). In the illustrated embodiment, a pair of supports 94 are provided along either side of the base 92. The illustrated supports 94 are U-shaped, each of the supports 94 including a pair of downwardly extending legs 98 and one or more horizontal support elements 100 connecting the legs 98. Those of skill in the art will appreciate that the supports 94 may be of an alternative design, however. For example, the three, four, or more downwardly extending legs 98 may be provided, with or without a horizontal support element 100.

The carrier 104 includes a trailer 106 and a transporter 108 supported on a plurality of ground engaging members 110, 112 configured for propelling the carrier 104 along a surface. In the illustrated embodiment, for example, the ground engaging members 110, 112 include a plurality of wheels 114, 116 supported on at least one carrier axle 118, 120. That is, the trailer 106 is supported on a first plurality of ground engaging members 110 in the form of trailer wheels 114 supported on trailer axle 118, while the transporter 108 is supported on a second plurality of ground engaging members 112 in the form of transporter wheels 116 supported on transporter axle 120. Those of skill in the art will appreciate, however, that alternate support arrangements are envisioned. For example, the trailer 106 may be supported on two sets of trailer wheels 114 supported on a pair of trailer axles, respectively, and/or the transporter 108 may be supported on two sets of transporter wheels 116 supported on a pair of transporter axles, respectively.

The carrier 104 further includes a prime mover 122, which may be of any appropriate design. For example, the prime mover 122 may be an engine 124 and may be coupled to the ground engaging members 112 by way of a drive train 126. In the illustrated embodiment, the prime mover 122 is disposed with the transporter 108. It will be appreciated, however, that a portion or the entirety of the prime mover 122 may be alternatively disposed.

The carrier 104 may further include a cab 128 that may be used to carry an operator. In the illustrated embodiment, the cab 128 is disposed with the transporter 108, although the cab may be disposed with the trailer 106 in alternative embodiments. In alternative embodiments, however, the carrier 104 may be remotely operated by one or more controllers (not illustrated) in an autonomous operation.

Figure 3:
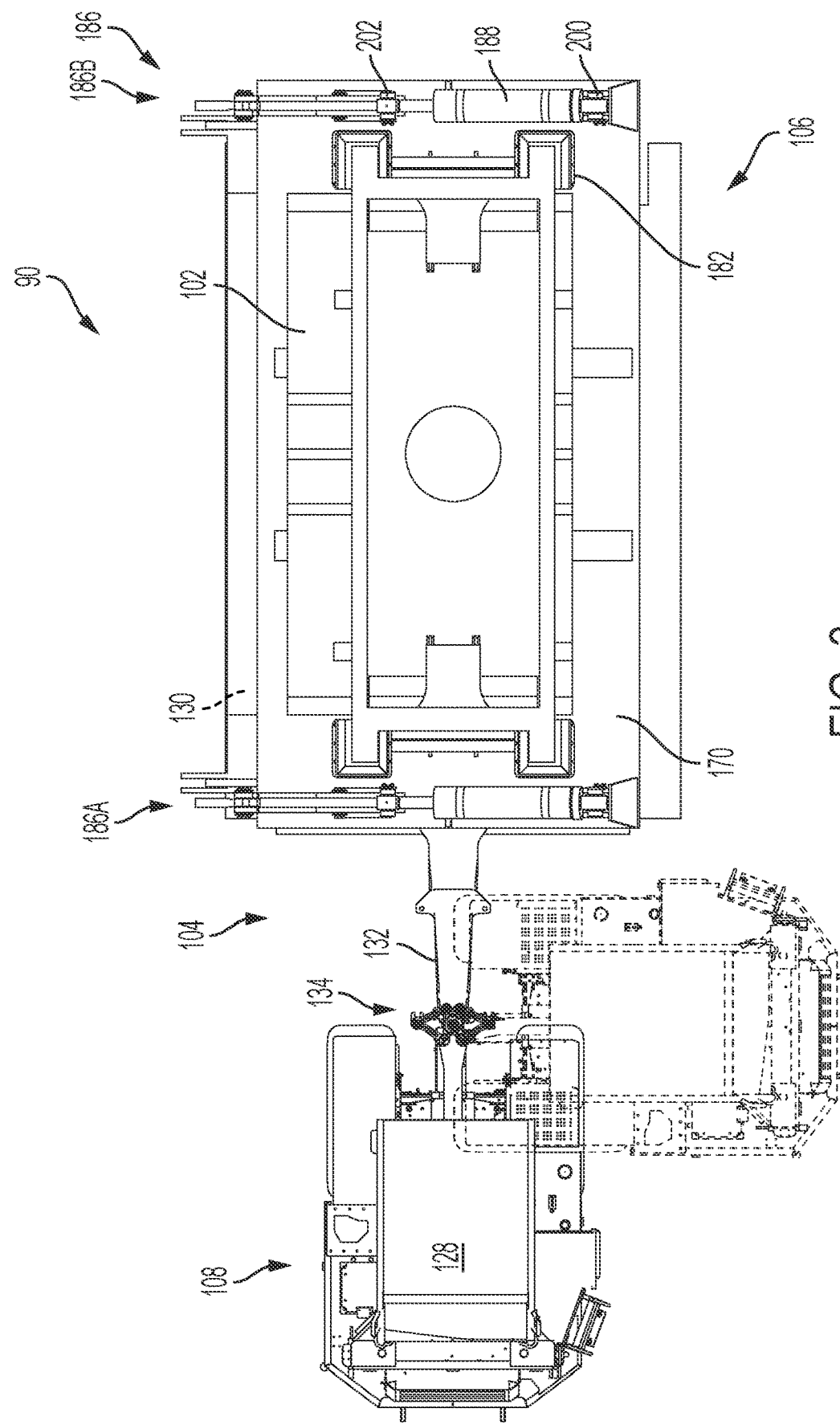
FIG. 3 is a top plan view of the transporter, carrier and dumping pallet of FIGS. 1 and 2 illustrating a cab of the transporter in line with the carrier, and illustrating in phantom lines the cab of the transporter in a turned position relative to the carrier.

The trailer 106 includes a supporting trailer portion 130 and a forwardly extending attachment portion 132 coupled to the transporter 108 at a hitch 134. The hitch 134 may be of any appropriate design, preferably allowing the trailer 106 to pivot relative to the transporter 108 in order to facilitate the carrier 104 turning corners. As illustrated in FIG. 3, for example, the hitch 134 in conjunction with the illustrated ground engaging member 110, 112 including a set of trailer wheels 114 disposed on a single trailer axle 118, and a set of transporter wheels 116 disposed on a single transporter axle 120 facilitates the carrier 104 turning of substantially 90° corners.

Figure 4:
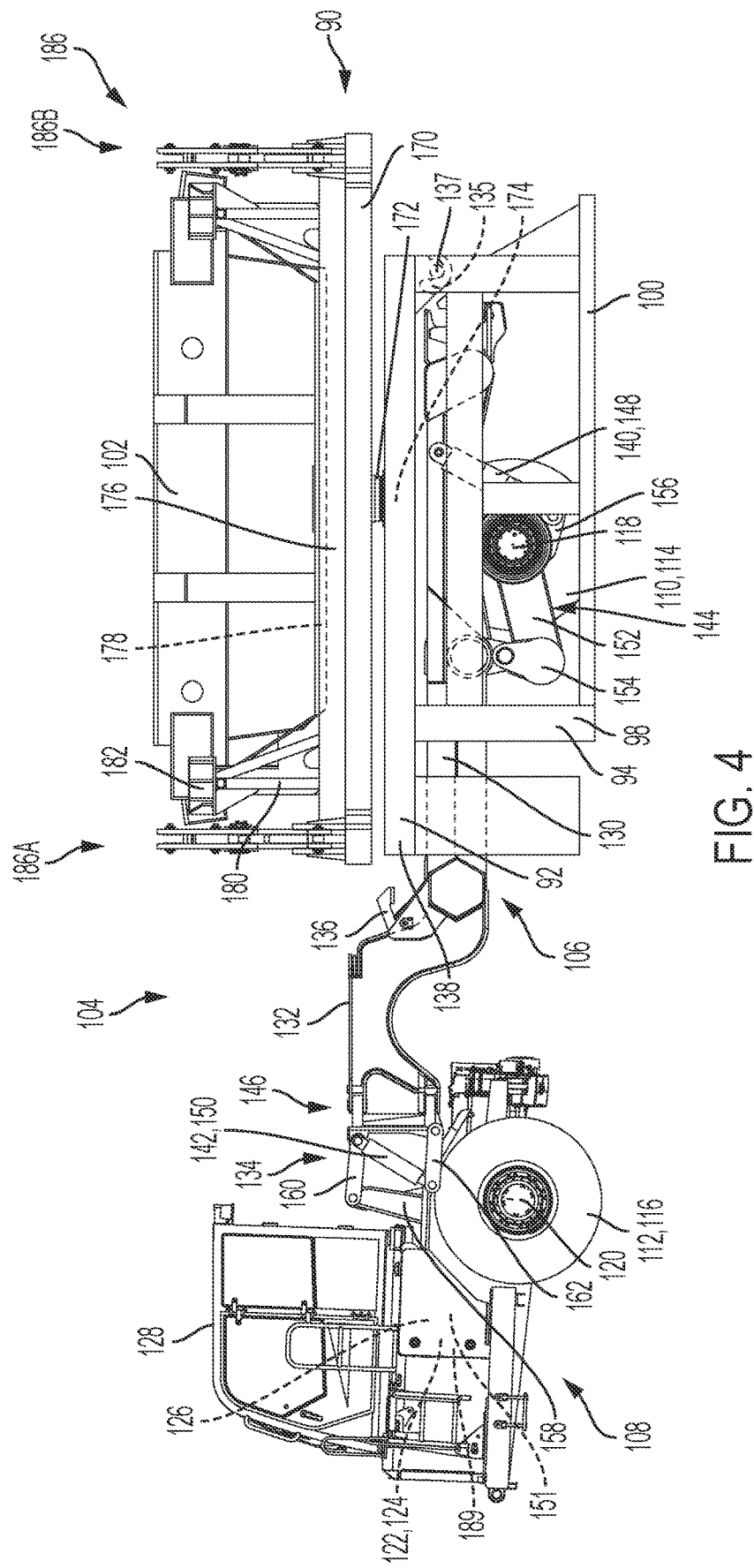
FIG. 4 is a side elevational view of the transporter, carrier and dumping pallet of FIGS. 1-3, the carrier being in a lowered position to pick up a dumping pallet.

The supporting trailer portion 130 is sized to be received between the supports 94 of the pallet 90 such that the supporting trailer portion 130 may be positioned between the supports 94 to permit transport of the pallet 90 between locations. In order to engage the pallet 90 for transport, at least a portion of the supporting trailer portion 130 is movable between a lowered position and a raised support position. Referring to FIG. 4, the carrier 104 is illustrated with the supporting trailer portion 130 in a lowered, disengaged position relative to the pallet 90, i.e., as the supporting trailer portion 130 may be disposed when the trailer 106 is moving into or out of engagement with the pallet 90. In order to assist in maintaining the base 92 of the pallet 90 in position relative to the supporting trailer portion 130, one or more retainers 136 may be provided. In the illustrated embodiment, the trailer 106 is provided with a retaining assembly, which includes one or more retainers 136 disposed to receive a forward end 138 of the base 92 of the pallet 90. In this way, as the supporting trailer portion 130 of the trailer 106 is moved into position below the pallet 90, the forward end 138 of the base 92 of the pallet 90 may be received in the retainer(s) 136 (see FIG. 5). Those of skill in the art will appreciate that the illustrated retainer 136 may restrain the base 92 not only in a forward direction of the carrier 104, but also in a vertical direction if a moment is applied to the base in a rearward or sideward direction.

The trailer 106 and pallet 90 may be provided with additional retaining structures. For example, in the illustrated embodiment, one or more cradles 135 are provided near the rear of the supporting trailer portion 130, and one or more cooperating protrusions 137 are provided extending from a lower surface of the base 92 of the pallet 90. In this embodiment a pair of such cradles 135 and cooperating protrusions 137 are provided and spaced apart from one another, as may be seen in FIG. 2. In operation, the supporting trailer portion 130 is backed into position beneath the base 92, the trailer 106 continuing rearward until the retainers 136 engage the forward end 138 of the base 92 and the cradles 135 engage the cooperating protrusions 137.

It will be appreciated that an alternative or additional retainer assembly may be provided, however. By way of example only, the pallet 90 may be provided with one or more alternative retainers that may be moved into position to engage the trailer 106.

Figure 5:
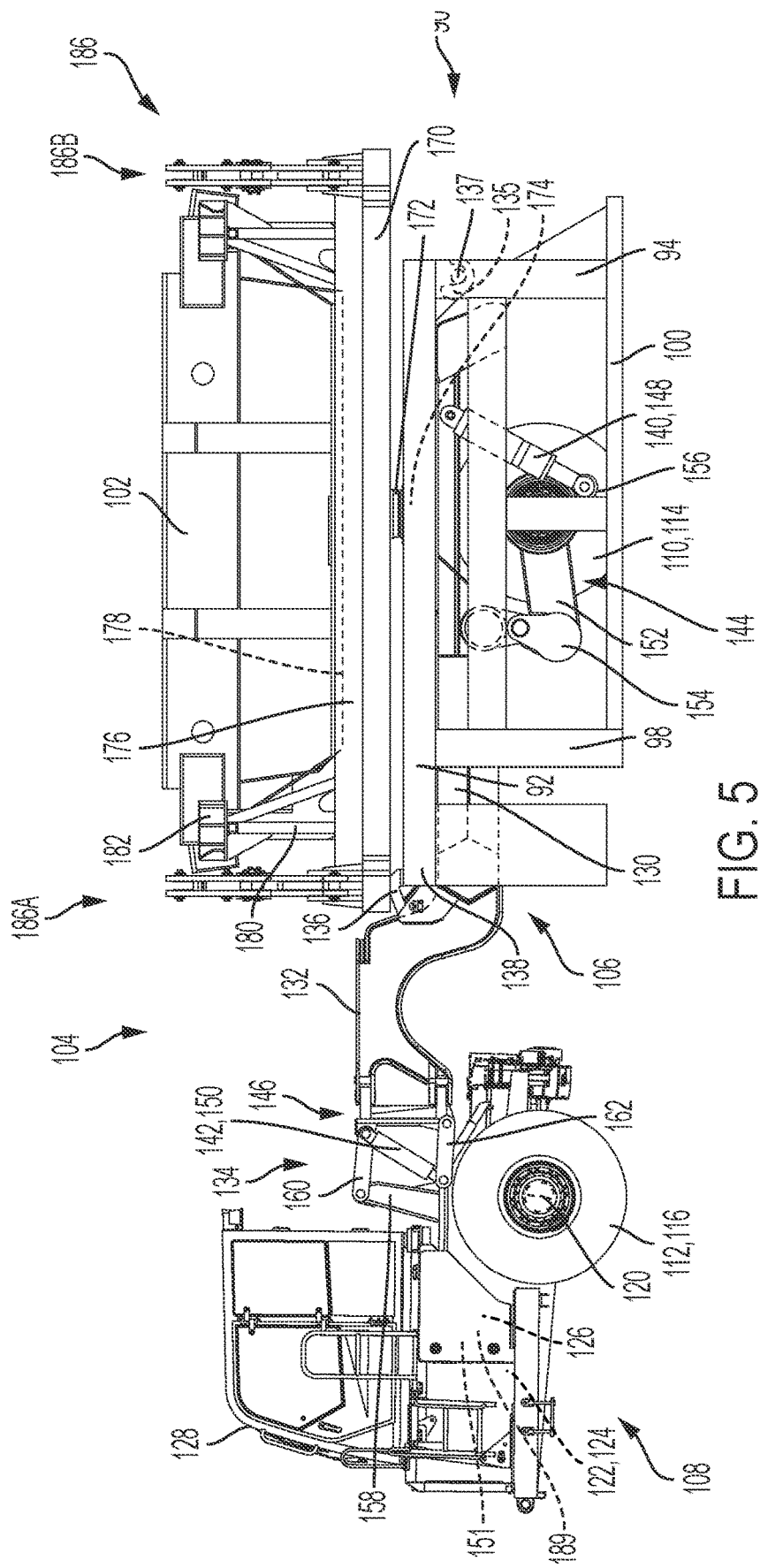
FIG. 5 is a side elevational view of the transporter, carrier and dumping pallet of FIGS. 1-4, the carrier being in a lowered and latched position.
Figure 6:
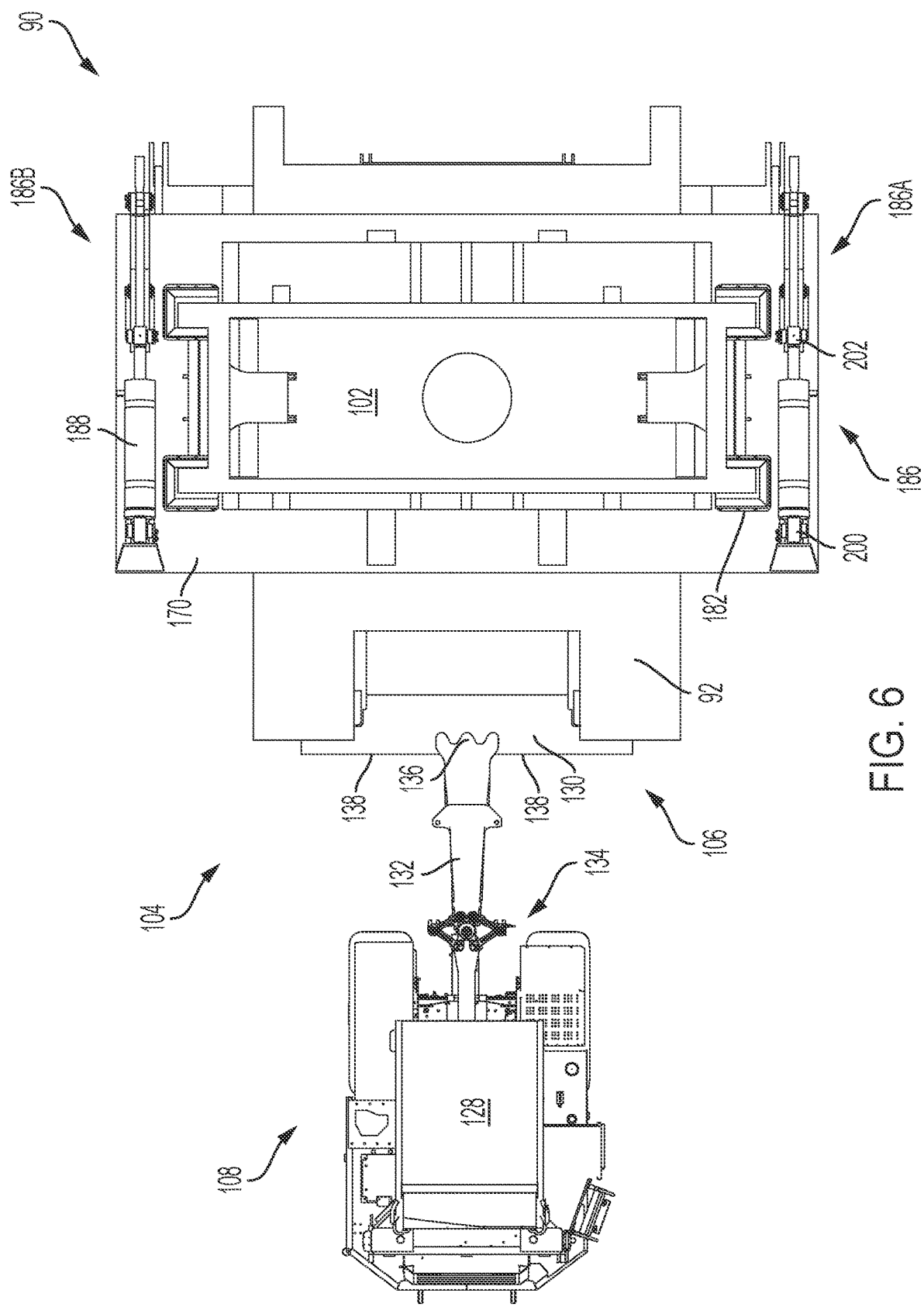
FIG. 6 is a top plan view of the transporter, carrier and dumping pallet of FIGS. 1-5, the dumping pallet being in a rotated position relative to the carrier.

In order to move the supporting trailer portion 130 of the trailer 106 between the lowered position of FIG. 5, and the raised support position of FIG. 1, at least one carrier actuator 140, 142 is provided. In at least one embodiment, the at least one carrier actuator 140, 142 includes at least one carrier linkage arrangement 144, 146 with at least one carrier hydraulic actuator 148, 150. When the at least one carrier actuator 140, 142 is provided as at least one carrier hydraulic actuator 148, 150, hydraulic pressure may be provided by any appropriate source of hydraulic pressure 151, such as, for example, a hydraulic fluid tank and pump. While the source of hydraulic pressure 151 is illustrated with the transporter 108, those of skill in the art will appreciate that the source of hydraulic pressure 151 may be disposed at any appropriate location, such as, with the trailer 106.

In the illustrated embodiment, the at least one carrier linkage arrangement 144 couples the supporting trailer portion 130 to the first plurality of ground engaging members 110 supporting the trailer 106, and the at least one carrier hydraulic actuator 148 is disposed between the supporting trailer portion 130 and the first plurality of ground engaging members 110. In the illustrated embodiment, the at least one carrier linkage arrangement 146 and carrier hydraulic actuator 150 are provided at the hitch 134 between the transporter 108 and the trailer 106, as will be discussed further below.

Any appropriate carrier linkage arrangement 144 may be provided. A carrier linkage arrangement 144 may include, for example, a first trailer link 152 pivotably coupled at the trailer axle 118 at one end and a second trailer link 154 at the opposite end of the first trailer link 152. The opposite end of the second trailer link 154 may be pivotably coupled to the supporting trailer portion 130. One end of a carrier hydraulic actuator 148 may be coupled either directed or by way of a third trailer link 156 to the trailer axle 118 (see FIGS. 4 and 5), while the other end of the carrier hydraulic actuator 148 is coupled to the supporting trailer portion 130. In the illustrated embodiment, the third trailer link 156 is secured with the first trailer link 152 such that the third trailer link 156 pivots with the first trailer link 152 relative to the trailer axle 118. In this way, the first and third trailer links 152, 156, the second trailer link 154, the carrier hydraulic actuator 148, and the supporting trailer portion 130 itself between the carrier hydraulic actuator 148 and the second trailer link 154 form a four-bar linkage. Movement of the carrier hydraulic actuator 148 between retracted and extended positions moves the supporting trailer portion 130 between lowered position of FIG. 5 and the raised support position of FIG. 1.

While the hitch 134 may be of any appropriate design, in the illustrated embodiment, the hitch 134 includes the at least one carrier linkage arrangement 146 in conjunction, which couples the trailer 106 to the transporter 108, and the at least one carrier hydraulic actuator 150. While such a carrier linkage arrangement 146 may be of an alternative design, the carrier linkage arrangement 146 may include, for example, a first hitch link 158 secured with the transporter 108 such that the transporter 108 itself acts as a stationary link. A second hitch link 160 may be pivotably coupled to the first hitch link 158 and the trailer 106. A third hitch link 162 may be pivotably coupled to the transporter 108 and the trailer 106. The pivotable coupling of the second and third hitch links 160, 162 to the trailer 106 are spaced apart such that the trailer 106 itself acts as a connecting link in a four-bar carrier linkage arrangement 146 including the transporter 108 by way of the first hitch link 158, the second hitch link 160, the trailer 106 itself between the second and third hitch links 160, 162, and the third hitch link 162. The position of the carrier linkage arrangement 146 may be determined by the position of the carrier hydraulic actuator 150, which may extend to position the carrier linkage arrangement 146 in the raised support position of FIG. 1, and retract to position the carrier linkage arrangement 146 in the lowered position of FIG. 5.

According to a feature of the disclosed pallet 90, a supported container 102 may be moved to position to dump the contents of the container 102. In order to facilitate the dumping of a supported container 102, the pallet 90 further includes a first platform 170 that is rotatably supported on the base 92 by column 172. A rotational force may be provided to the first platform 170 by any appropriate manual or automatic mechanism, such as, for example, a motor, an engine, or a hydraulic pallet actuator (rotational drive shown generally as 174). By way of further example, the column 172 may include a drive element that extends through the base 92 to be engaged by a drive from the transporter 108. The first platform 170 may be positioned as illustrated, for example, in FIGS. 1-5 for transport of the pallet 90, or rotated to the position illustrated in FIGS. 6 and 7 for dumping a supported container 102, as will be explained in further detail below. Those of skill in the art will appreciate that the first platform 170 is substantially parallel to the base 92, the first platform 170 likewise being substantially parallel to the base 92 as a rotational force is applied.

The pallet 90 further includes a second platform 176 is also adapted to support a container 102. The container 102 may be at least partially received within a recess (see 178) in an upper surface of the second platform 176. In order to permit a supported container 102 to be dumped, the container 102 may be further secured to the second platform 176 by any appropriate mechanism. For example, in the illustrated embodiment, the upright structures 180 and support brackets 182 extend from the second platform 176 along opposite sides of the container 102 to secure the container 102 to the second platform 176.

Figure 2:
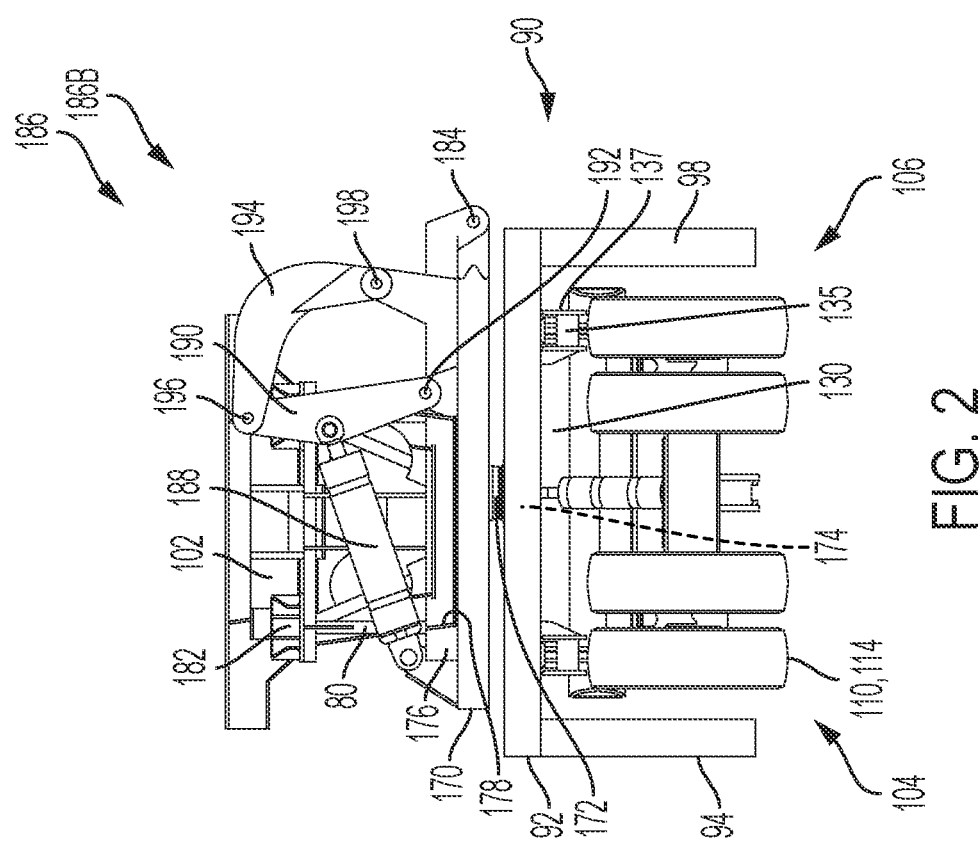
FIG. 2 is a rear elevational view of the carrier and dumping pallet of FIG. 1.
Figure 7:
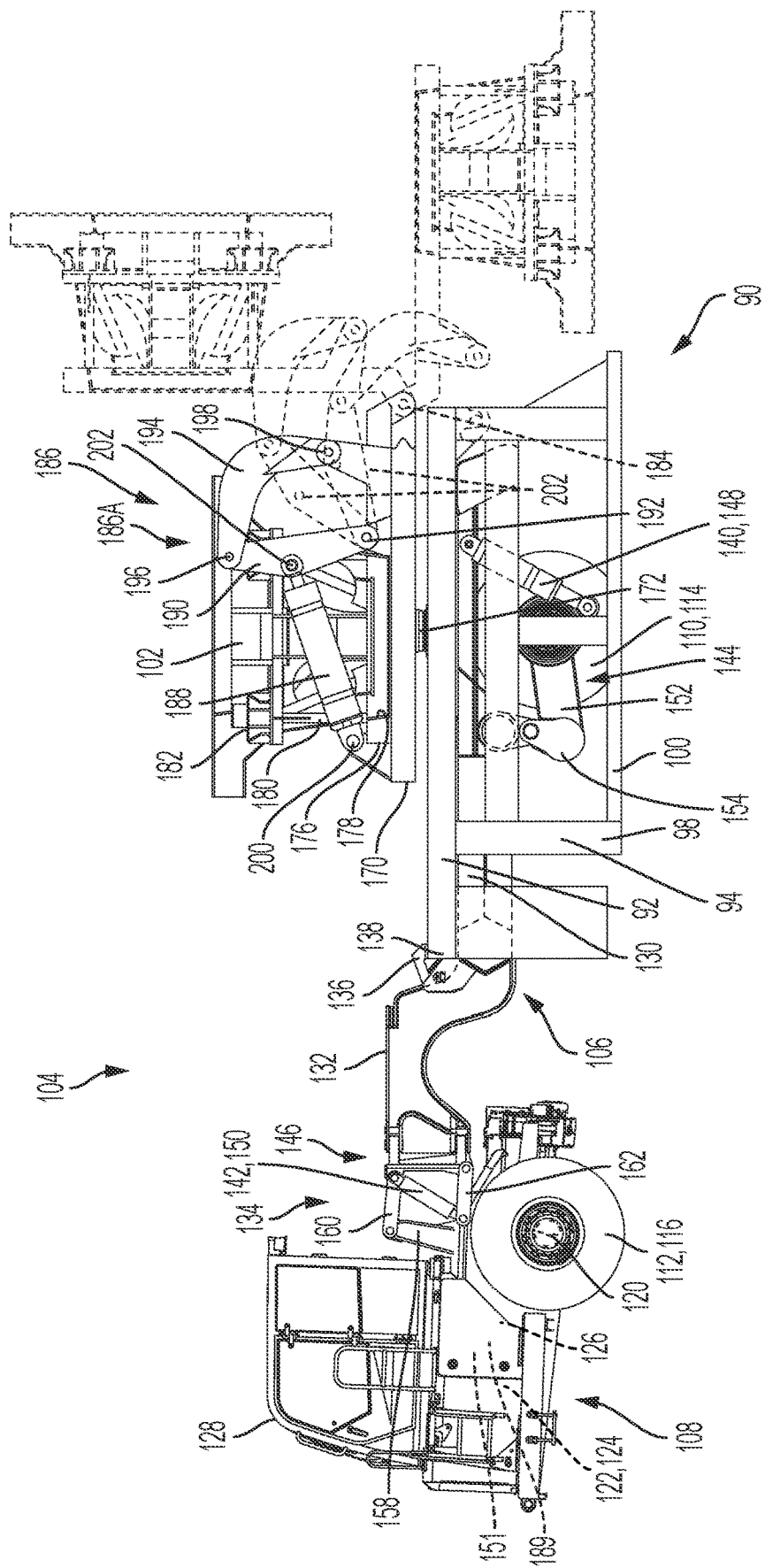
FIG. 7 is a side elevational view of the transporter, carrier and dumping pallet of FIG. 6, the dumping pallet being in a rotated position relative to the carrier, and the pallet being illustrated in phantom lines in a series of positions to dump a container supported on the dumping pallet.

Referring to FIGS. 2 and 7, the second platform 176 is pivotably coupled to the first platform 170 at pivot point 184 for movement between a transport position (see FIGS. 1-3) and a dump position (see position illustrated in phantom in FIG. 7). It will be appreciated that the retainer 136 may assist in exerting a retaining force on the base 92 as the second platform 176 pivots relative to the first platform 170. In this way, the base 92 and second platform 176 are maintained with the carrier 104 during the dumping process.

In order to provide the pivoting movement of the second platform 176 relative to the first platform 170, the pallet 90 further includes at least one pallet linkage arrangement 186 coupling the second platform 176 and the first platform 170, and at least one pallet actuator 188 disposed to pivot the second platform 176 relative to the first platform 170 between the transport position and the dump position. In the illustrated embodiment, the at least one pallet linkage arrangement 186 includes a first pallet linkage arrangement 186A disposed along a first side of the second platform 176 and a second pallet linkage arrangement 186B disposed along an opposite side of the second platform 176.

While the pallet linkage arrangement 186 may be of any appropriate design, the pallet linkage arrangement 186 of the illustrated embodiment includes a four-bar linkage arrangement. That is, the pallet linkage arrangement 186 includes a first pallet link 190 that is pivotably coupled to the first platform 170 at pivot point 192. A second pallet link 194 is coupled to the first pallet link 190 at pivot point 196. The second pallet link 194 is further pivotably coupled to the second platform 176 at pivot point 198. Accordingly, in this embodiment, the four-bar linkage arrangement includes the first platform 170, the second platform 176, the first pallet link 190, and the second pallet link 194, the first pallet link 190 being pivotably coupled between the first platform 170 and the second pallet link 194, the second pallet link 194 being pivotably coupled between the first pallet link 190 and the second platform 176, and the first and second platforms 170, 176 being pivotably coupled together.

While the at least one pallet actuator 188 may be of any appropriate design, the pallet actuator 188 of the illustrated embodiment is a hydraulic pallet actuator. Further, while any appropriate number of pallet actuators 188 may be provided and may be positioned in any appropriate location, in the illustrated embodiment, pallet actuators 188, that is, hydraulic pallet actuators, are provided on opposite sides of the second platform 176 and disposed to engage respective pallet linkage arrangements 186. More specifically, for each of the pallet linkage arrangements 186, the pallet actuator 188 is pivotably coupled to the first pallet link 190 and the first platform 170. That is, one end of the pallet actuator 188 is pivotably coupled to the first platform 170 at pivot point 200, and the opposite end of the pallet actuator 188 is coupled to the first pallet link 190 at pivot point 202. While pivot point 202 is disposed at a midpoint along the first pallet link 190, it will be appreciated that the pivot point 202 could be alternatively disposed, for example, nearer to the pivot point 196.

When hydraulic pallet actuators 188 are utilized, hydraulic pressure may be provided by any appropriate source of hydraulic pressure 189, such as, for example, a hydraulic fluid tank and pump. Those of skill in the art will appreciate that the source of hydraulic pressure 189 may be disposed at any appropriate location, such as, for example, with the transporter 108, or with the pallet 90. By way of further example, the source of hydraulic pressure 189 may be coincident with the source of hydraulic pressure 151 provided for operation of one or more carrier hydraulic actuators 148 and/or carrier hydraulic actuators 150, or may be provided as a separate hydraulic system.

In FIG. 7, the second platform 176 and pallet linkage arrangement 186 are illustrated in broken lines in progressive positions of dumping the container 102. In the interests of simplicity, the pallet actuator 188 is not illustrated in the progressive positions of dumping. It will be appreciated; however, the distal end of the pallet actuator 188 remains pivotably coupled to the first pallet link 190 at pivot point 202. Accordingly, as the pallet actuator 188 extends, the pallet actuator 188 causes the first pallet link 190 to pivot relative to the first platform 170. Pivoting of the first pallet link 190 causes an associated movement of the second pallet link 194, and a pivoting of the second platform 176 relative to the first platform 170. Similarly, as the pallet actuator 188 is retracted, the pallet actuator 188 pivots the first pallet link 190, causing the movement of the second pallet link 194, and the pivoting of the second platform 176 back into position on the first platform 170. It will be appreciated by those of skill in the art that the illustrated pallet linkage arrangement 186 and pallet actuator 188 allow the container 102 to be pivoted on the order of at least 180° in at least some embodiments to facilitate dumping of the contents of the container 102.

An alternate embodiment of a carrier 210 and pallet 212 according to the disclosure is illustrated in FIGS. 8-12. Structure not specifically described with regard to FIGS. 8-12 is the same as or similar to the corresponding structure in FIGS. 1-7. As with the embodiment of FIGS. 1-7, the carrier 210 includes a trailer 214 having a forwardly-extending attachment portion 216 coupled to a transporter 218 by a linkage arrangement 220. In the embodiment of FIGS. 8-12, hydraulic cylinders 222 are provided along either side between the linkage arrangement 220 and the forwardly-extending attachment portion 216 of the trailer 214, only one such hydraulic cylinder 222 being visible in the figures. The trailer 214 further includes a supporting trailer portion 224 supported by a plurality of ground engaging members 226, here, wheels.

Figure 8:
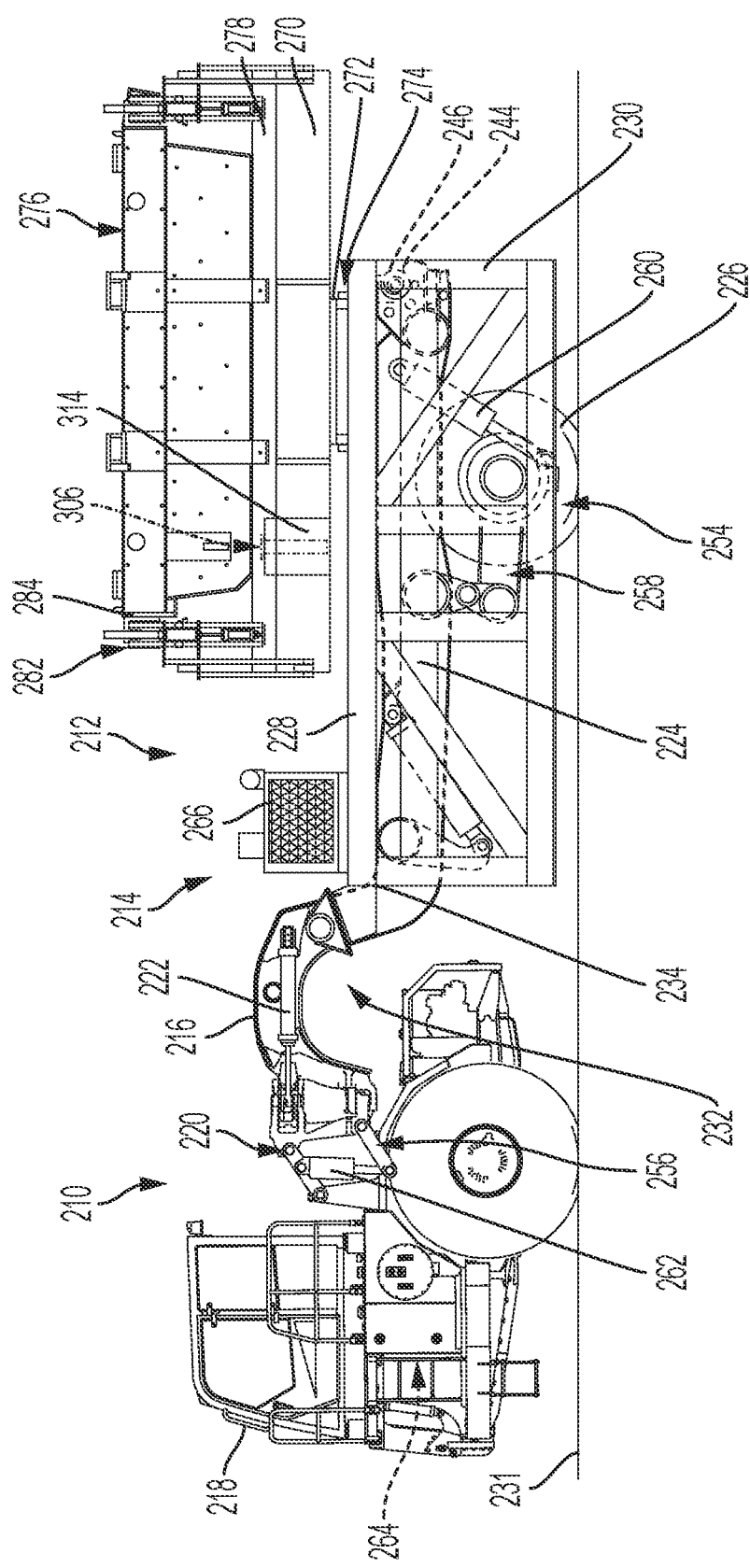
FIG. 8 is a side elevational view of a second embodiment of a transporter, carrier, and dumping pallet according to teaching of this disclosure, the carrier being in a raised transport position.

The pallet 212 includes a base 228 and a plurality of supports 230. In the illustrated embodiment, a pair of supports 230 are provided along either side of the base 228. In order to engage the pallet 212 for transport, at least a portion of the supporting trailer portion 224 is movable between a lowered position and a raised support position relative to a surface 231. Referring to FIG. 8, the carrier 210 is illustrated with the supporting trailer portion 224 in a raised, engaged position. Referring to FIGS. 9-12, the carrier is illustrated with the supporting trailer portion 224 in a lowered, engaged position relative to the pallet 212.

In order to assist in maintaining a vertical position of the base 228 relative to the trailer 214, a retainer assembly 232 is provided between a forward end 234 of the base 228 and trailer 214. In this embodiment, the retainer assembly 232 includes carrier ramp pads 236 that extend transversely outward from either side of the forwardly-extending attachment portion 216 of the trailer 214, and cooperating pallet ramp pads 238 at the forward end 234 of the base 228 of the pallet 212. The pallet ramp pads 238 are supported by spaced, forwardly-extending arms 240 that extend from the forward end 234 of the base 228.

In use, the operator backs the supporting trailer portion 224 of the trailer 214 into position beneath the pallet 212 seated on the surface 231. That is, the supporting trailer portion 224 is advanced rearward beneath the base 228 between the plurality of supports 230 along either side of the base 228. As the trailer 214 continues rearward, the carrier ramp pads 236 engage the pallet ramp pads 238 to dispose the pallet ramp pads 238 substantially subjacent the carrier ramp pads 236. In order to facilitate engagement between the carrier ramp pads 236 and the pallet ramp pads 238, the ramp pads 236, 238 are disposed at an angle to a direction of movement as the supportive trail portion is advanced rearward beneath the base 228. In at least one embodiment, the carrier ramp pads 236 are pivotably coupled to the forwardly-extending attachment portion 216 such that they may pivot about axis 242.

The trailer 214 and pallet 212 may be provided with additional retaining structures. For example, in the illustrated embodiment, one or more cradles 244 are provided near the rear of the supporting trailer portion 224, and one or more cooperating protrusions 246 are provided extending from a lower surface of the base 228 of the pallet 212.

In order to move the supporting trailer portion 224 of the trailer 214 between the raised support position of FIG. 8 and the lowered position of FIG. 9-12, and vice versa, at least one carrier actuator 254, 256 is provided. In the embodiment illustrated in FIGS. 8-12 is similar to the embodiment of FIGS. 1-7, that is at least one carrier actuator 254, 256 includes at least one carrier linkage arrangement 258, 220 with at least one carrier hydraulic actuator 260, 262, which operate in a manner as described with regard to FIGS. 1-7. Hydraulic pressure may be provided to any carrier hydraulic actuators, including hydraulic actuators 222, 260, 262 by any appropriate source of hydraulic pressure 264, such as, for example, a hydraulic fluid tank and pump associated with the trailer 214. While the source of hydraulic pressure 264 is illustrated with the transporter 218, those of skill in the art will appreciate that the source of hydraulic pressure 264 may be disposed at any appropriate location, such as, with the trailer 214.

Returning now to the structure of the pallet 212, the pallet 212 further includes a first platform 270 that is rotatably supported on the base 228 by column 272. A rotational force may be provided to the first platform 270 by any appropriate manual or automatic mechanism, such as, for example, a motor, an engine, or a hydraulic pallet actuator (rotational drive shown generally as 274). The first platform 270 may be positioned as illustrated, for example, in FIG. 8 for transport of the pallet 212, or rotated to the position illustrated in FIGS. 9-12 for dumping a supported container 276, as will be explained in further detail below.

The pallet 212 further includes a second platform 278 is adapted to support the container 276. The container 276 may be at least partially received within a cradle (see 280) of the second platform 278. In order to permit a supported container 276 to be dumped, the container 276 may be further secured to the second platform 278 by any appropriate mechanism. For example, in the illustrated embodiment, the upright structures 282 and support brackets 284 extend from the second platform 278 along opposite sides of the container 276 to secure the container 276 to the second platform 278.

Referring to FIGS. 9-12, the second platform 278 is pivotably coupled to the first platform 270 at pivot point 286 for movement between the transport position (see FIG. 8) and the dump positions (see FIGS. 9-12). It will be appreciated that the retainer assembly 232 may assist in exerting a retaining force on the base 228 as the second platform 278 pivots relative to the first platform 270. In this way, the base 228 and second platform 278 are maintained with the carrier 210 during the dumping process.

In order to provide the pivoting movement of the second platform 278 relative to the first platform 270, the pallet 212 further includes at least one pallet linkage arrangement 288 coupling the second platform 278 and the first platform 270, and at least one pallet actuator 290 disposed to pivot the second platform 278 relative to the first platform 270 between the transport position and the dump position. While the pallet linkage arrangement 288 may be of any appropriate design, the pallet linkage arrangement 288 of the embodiment illustrated in FIGS. 8-12 is similar to that of FIGS. 1-7 in that it includes a four-bar linkage arrangement. That is, the pallet linkage arrangement 288 includes a first pallet link 292 that is pivotably coupled to the first platform 270 at pivot point 294. A second pallet link 296 is coupled to the first pallet link 292 at pivot point 298. The second pallet link 296 if further pivotably coupled to the second platform 278 at pivot point 300. Accordingly, in this embodiment, the four-bar linkage arrangement includes the first pallet link 292, which is pivotably coupled to the second pallet link 296, which is pivotably coupled to the second platform 278, which is pivotably coupled to the first platform 270, which is pivotably coupled to the first pallet link 292.

While the at least one pallet actuator 290 may be of any appropriate design, the pallet actuator 290 of the illustrated embodiment is a hydraulic pallet actuator. One end of the pallet actuator 290 is pivotably coupled to the first platform 270 at pivot point 302, and the opposite end of the pallet actuator 290 is coupled to the first pallet link 292 at pivot point 304. While pivot point 304 is disposed at a midpoint along the first pallet link 292, it will be appreciated that the pivot point 304 could be alternatively disposed, for example, nearer to the pivot point 298. When one or more hydraulic pallet actuators 290 are utilized, hydraulic pressure may be provided by any appropriate source of hydraulic pressure, such as, for example, a hydraulic fluid tank and pump associated with a hydraulic power module 266 associated with the pallet 212.

Figure 9:
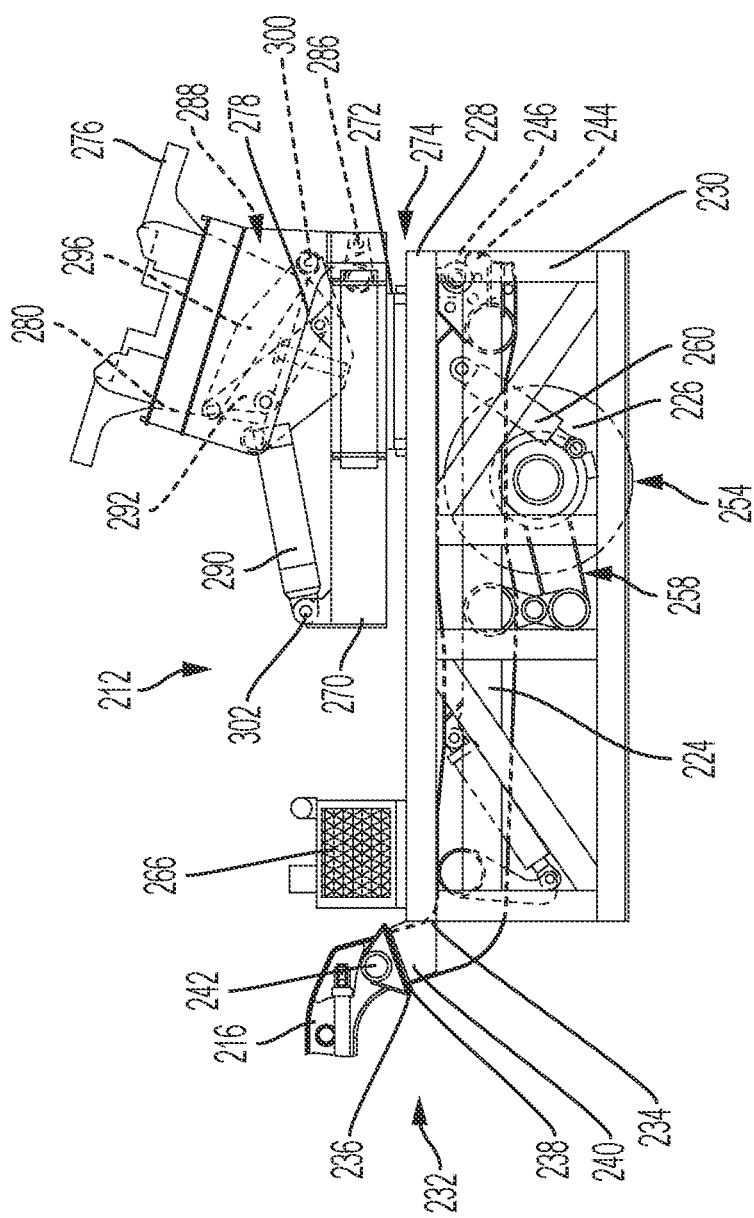
FIG. 9-11 are fragmentary side elevational views of the carrier and dumping pallet of FIG. 8 with the carrier being in a lowered and latched position, the dumping pallet in a series of positions to dump a container supported on the dumping pallet.
Figure 10:
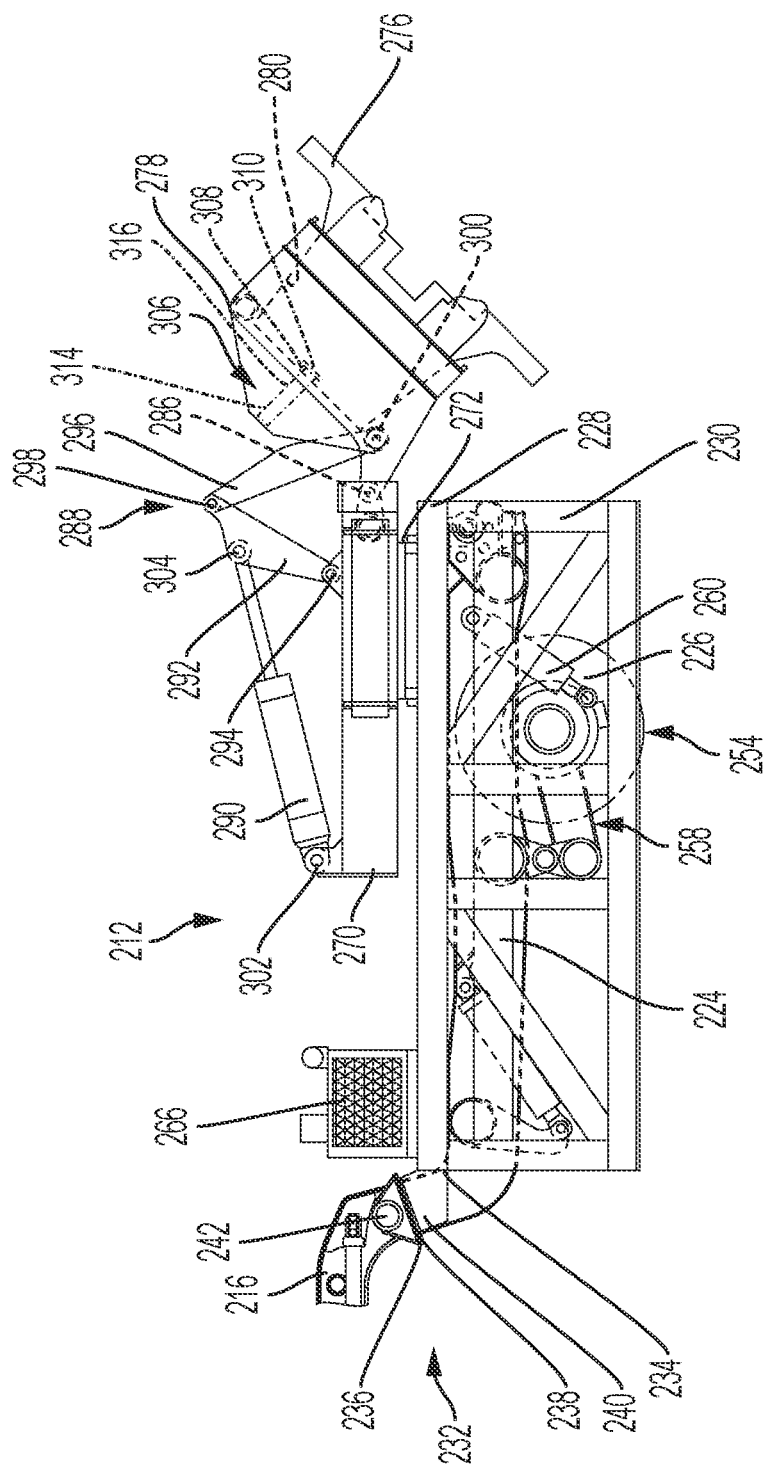
Figure 11:
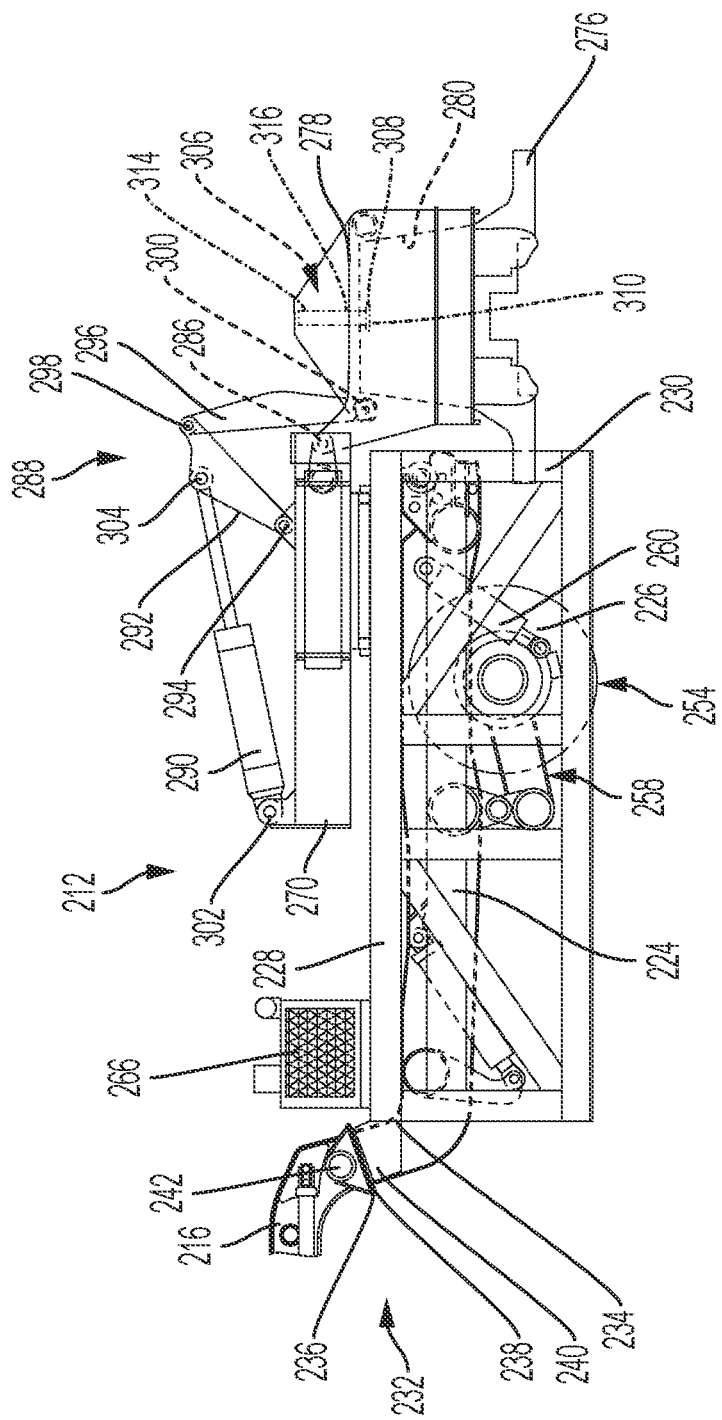
Figure 12:
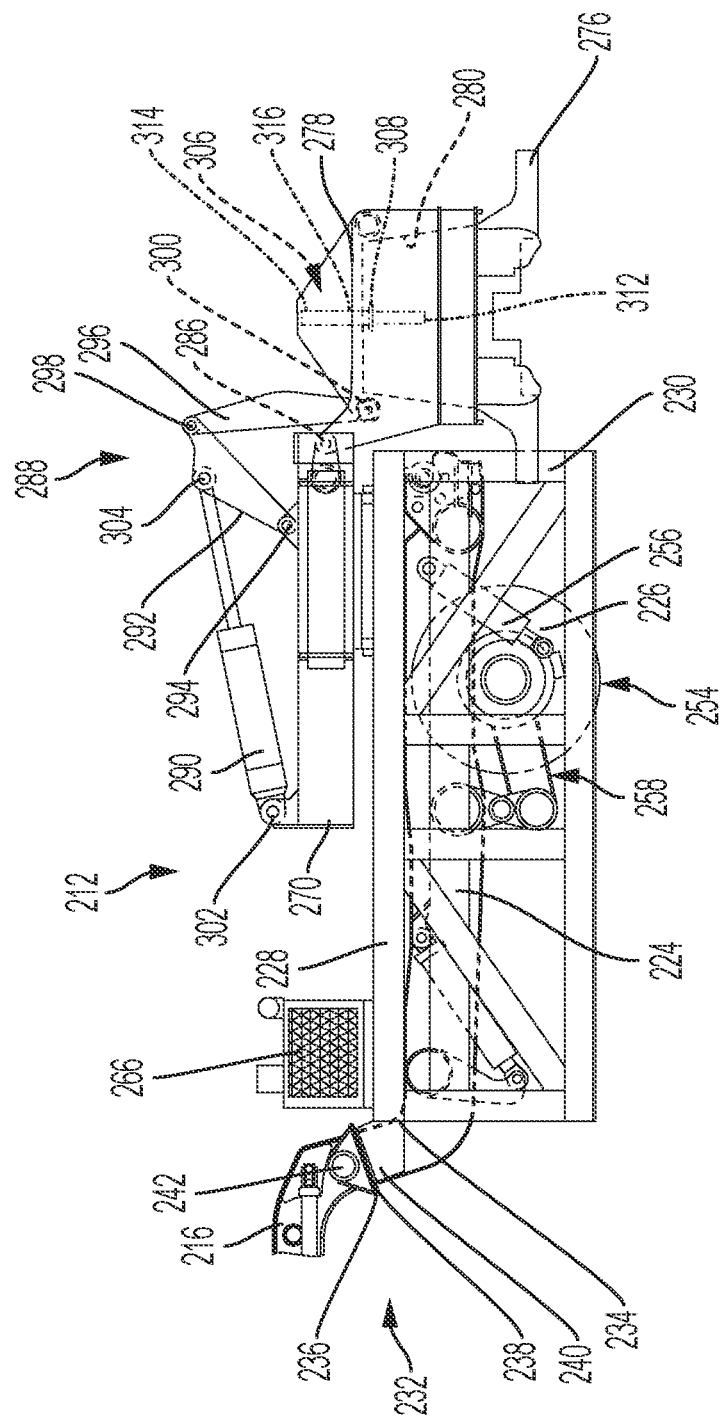
FIG. 12 is a fragmentary side elevational view of the carrier and dumping pallet of FIGS. 8-11, the dumping pallet being in a full dumping position with a pushing element extended.

In FIGS. 9-11, the second platform 278, pallet linkage arrangement 288, and pallet actuator 290 are illustrated in progressive positions of dumping the container 276. As the pallet actuator 290 extends, the pallet actuator 290 causes the first pallet link 292 to pivot relative to the first platform 270. Pivoting of the first pallet link 292 causes an associated movement of the second pallet link 296, and a pivoting of the second platform 278 relative to the first platform 270. Similarly, as the pallet actuator 290 is retracted, the pallet actuator 290 pivots the first pallet link 292, causing the movement of the second pallet link 296, and the pivoting of the second platform 278 back into position on the first platform 270.

In order to facilitate the full dumping of the contents of the container 276, the pallet 212 may further be provided with a pushing assembly 306 adapted to provide a concentrated force to a portion of the interior of the container 276. In the illustrated arrangement, the container 276 is provided with a through hole 308 that may be closed with a plug 310. The pushing assembly 306 may include a probe 312 adapted for movement by a source of mechanical movement 314. In the illustrated embodiment, the pushing assembly 306 is associated with the second platform 278, the probe 312 being disposed to advance toward and through the through hole 308 to apply a force to dislodge residual contents of the container 276, as illustrated, for example, in FIG. 12. Any appropriate source of mechanical movement 314 may be provided to advance and retract the probe 312 from the through hole 308. By way of example only, the probe 312 may be advanced by way of a hydraulic actuator 316. In this way, the probe 312 may be coupled to a rod associated with the hydraulic actuator 316, or the probe 312 may be the rod itself. It will be appreciated, however, that an alternative arrangement may be provided to provide movement to the probe 312, such as a mechanical gearing arrangement. Further, while the through hole 308 is provided in a bottom wall of the illustrated container 276 and the probe 312 disposed proximally to the bottom wall, it will be appreciated that the probe may be provided at an alternative position relative to the container. For example, the probe may be provided proximal to a side of the container should the through hole extend through a side of the container. It will additionally be appreciated that the pushing arrangement may be mounted for movement into position substantially adjacent the through hole. For example, all or a portion of the pushing assembly 306 may be pivotably mounted or slidably mounted so that the probe 312 maybe advanced into position relative to the through hole for operation.

Figure 13:
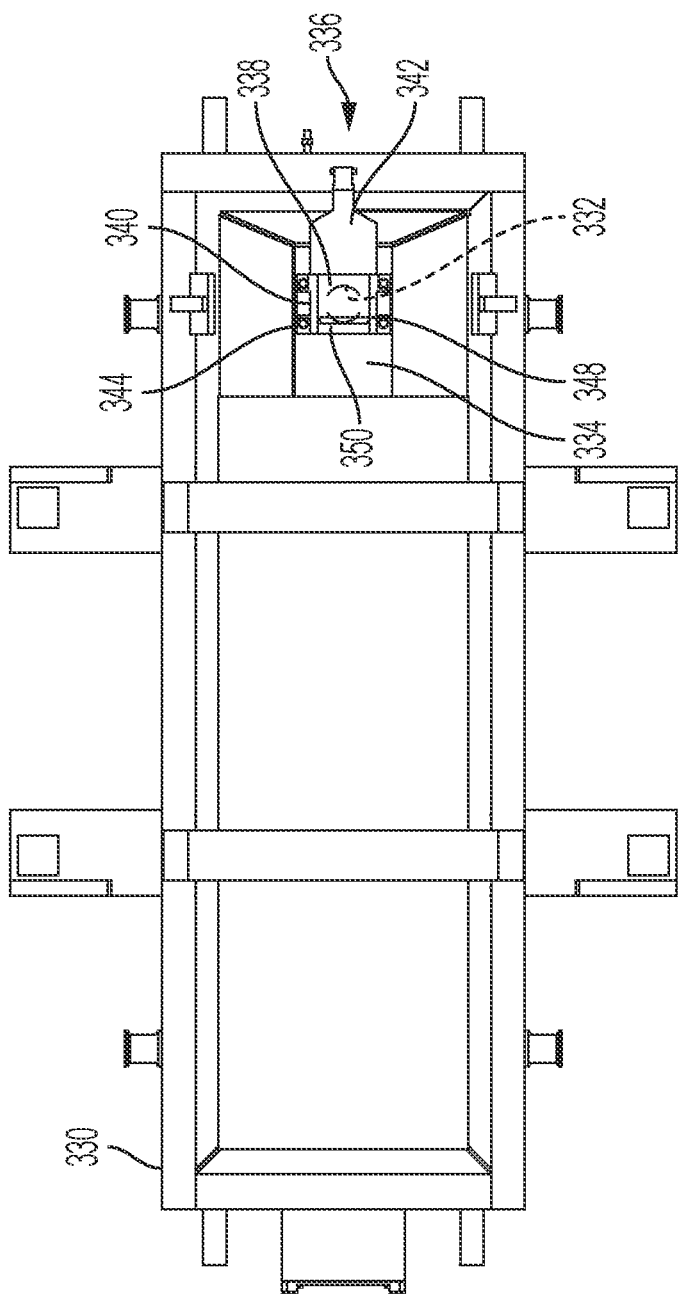
FIG. 13 is a bottom view of an alternative embodiment of a container suitable for use with a dumping pallet and suitable for use with embodiments of a carrier.
Figure 14:
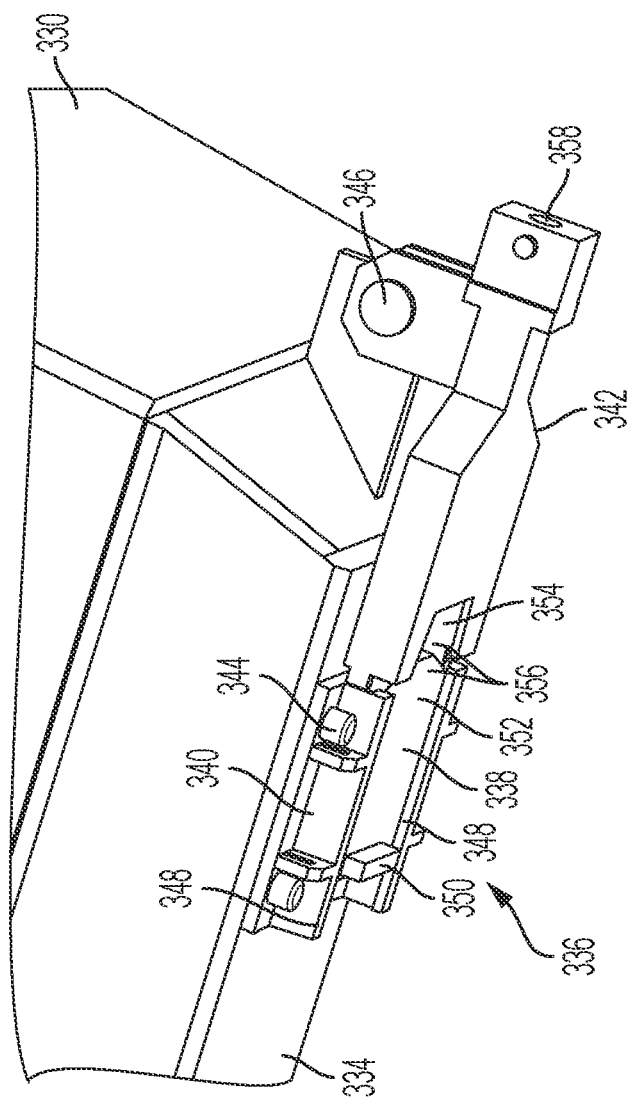
FIG. 14 is an enlarged, fragmentary isometric view of the container of FIG. 13.

An alternative embodiment of a container 330 is illustrated in FIGS. 13 and 14. Structure not specifically described with regard to the container 330 may be the same as or similar to the corresponding structure in FIGS. 1-12.

The container 330 of FIGS. 13 and 14 includes a gate or through hole 332 extending through or proximal to a bottom surface 334 of the container 330.

Referring to FIGS. 13-14 and 16-19, in order to selectively close the through hole 332, a slide gate assembly 336 is coupled to the container 330. The slide gate assembly 336 may include a selectively moveable slide gate 338 that is coupled to the container 330 by an appropriate retaining arrangement, such as a slide gate guide 340 and a slide gate receiver 342 illustrated. As visible in FIG. 14, the slide gate guide 340 and slide gate receiver 342 are coupled to the container at or proximal to the bottom surface 334 of the container 330 by any appropriate arrangement. In the illustrated embodiment, the slide gate guide 340 is coupled to the container 330 subjacent the through hole 332 of the container 330 by a plurality of couplers, such as bolts 344. The slide gate receiver 342 is coupled to the container 330 by any appropriate arrangement, such as a receiver pin 346.

The slide gate guide 340 includes a pair of flanges 348, as well as a support 350 which form a guide channel 352. When the slide gate 338 is disposed within the guide channel 352, the slide gate 338 is positioned to block flow through the through hole 332 of the container 330. Conversely, when the slide gate 338 is not disposed within the guide channel 352 subjacent the through hole 332 of the container 330, flow through the through hole 332 of the container 330 is not blocked inasmuch as a flow channel is established through the space between the flanges 348 of the slide gate guide 340.

Coupled to the container 330, the slide gate receiver 342 forms a receiving channel 354. Disposed substantially adjacent one another, the guide channel 352 of the slide gate guide 340 and the receiving channel 354 of the slide gate receiver 342 form a translation channel 356 for translation of the slide gate 338 between the guide channel 352 and the receiving channel 354 to block or unblock the through hole 332 of the container 330. That is, when the slide gate 338 is positioned primarily within the guide channel 352 of the slide gate guide 340, the through hole 332 of the container 330 is blocked with the slide gate 338. Conversely, when the slide gate 338 is positioned primarily within the receiving channel 354 of the slide gate receiver 342, the through hole 332 of the container is not blocked with the slide gate 338.

An actuation arrangement may be provided for translating the slide gate 338 within the translation channel 356. For example, as visible in FIG. 14, the slide gate receiver 342 may include a bore 358 through which a rod (not shown) may be advanced. Such a rod may be advanced or retracted by an appropriate arrangement, such as a hydraulic cylinder or other mechanical arrangement.

Figure 15:
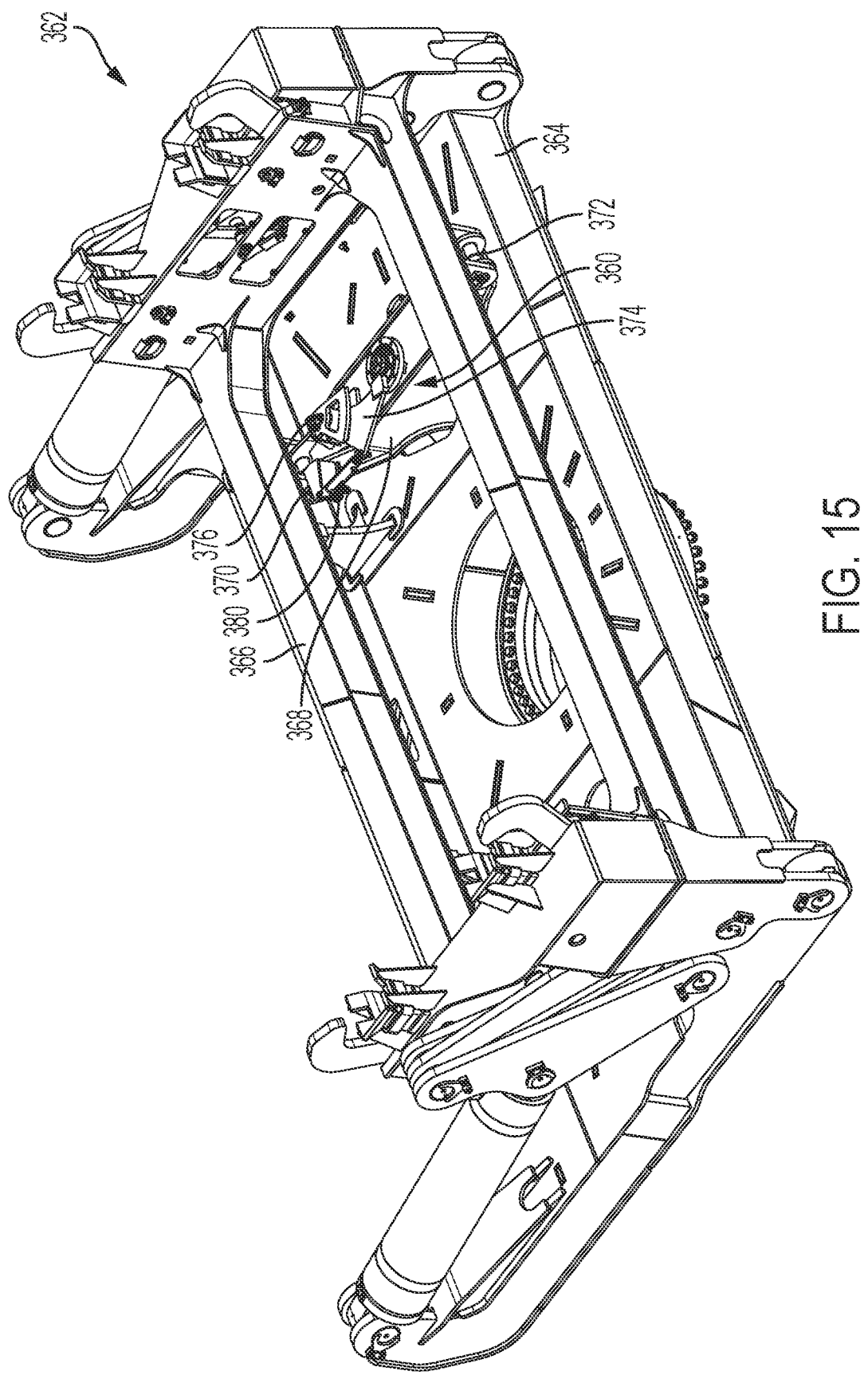
FIG. 15 is a fragmentary, isometric view of an alternative embodiment of a container support arrangement of a dumping pallet including a pushing assembly.

In at least one embodiment of the invention, a slide gate actuation arrangement 360 may be provided in conjunction with a pallet. A fragmentary view of a container support arrangement 362 of a pallet of at least one embodiment for use in conjunction with the container 330 of FIGS. 13 and 14 is illustrated in FIG. 15. The container support arrangement 362 includes a first platform 364, to which is pivotably coupled a second platform 366 (only a fragment of which is illustrated in FIG. 15). While not specifically illustrated, a pallet upon which the container support arrangement 362 is supported may be of any appropriate design, as, for example, the described in conjunction with any of FIGS. 1-12. Structure not specifically discussed with regard to the container, the container support arrangement 362, and other aspects of the pallet, as well as carriers that may transport such a pallet may be, for example, as described in greater detail with regard to other embodiments of this disclosure, such as the corresponding structure in FIGS. 1-12.

In the illustrated embodiment, the slide gate actuation arrangement 360 is coupled to the second platform 366, although an alternative arrangement may be provided. The slide gate actuation arrangement 360 is supported on or with a support bracket 368, which is coupled to the second platform 366 at coupling elements 370, 372. The support bracket 368 is generally T-shaped or Y-shaped although an alternative support arrangement may be provided.

The slide gate actuation arrangement 360 includes a slide gate actuating arm 374 that is pivotably coupled to the support bracket 368 at pivot point 376. The position of the slide gate actuating arm 374 is determined by a slide gate arm actuator 378. The slide gate arm actuator 378 may be of any appropriate design, such as a slide gate mechanism cylinder 380, which may be a hydraulic cylinder. The slide gate mechanism cylinder 380 is coupled to the support bracket 368 at a first end 382, and to the slide gate actuating arm 374 at a second end 384.

Figure 16:
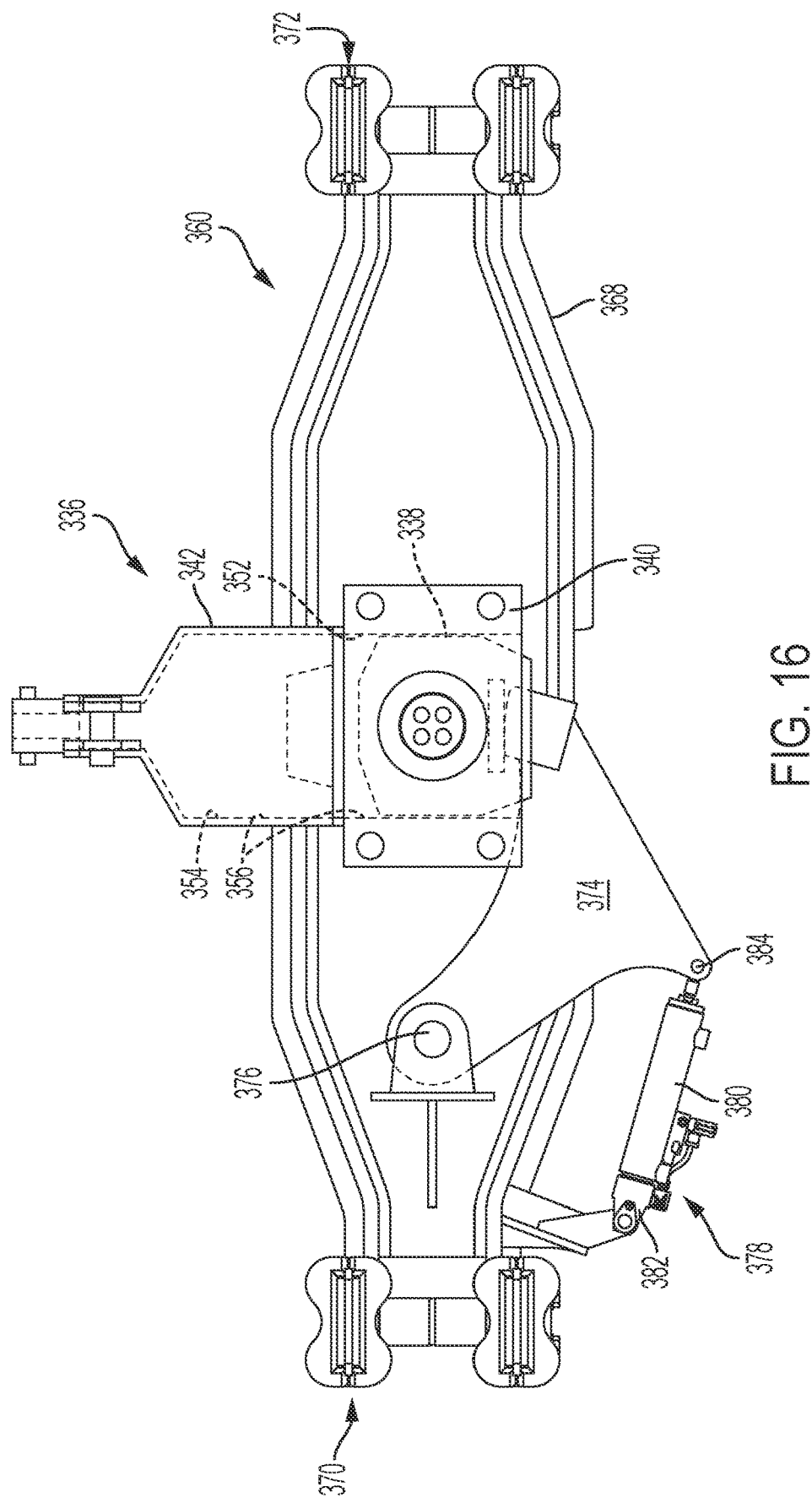
FIGS. 16-18 are fragmentary, plan views of a slide gate actuation arrangement of the container support arrangement of the dumping pallet of FIG. 15 and a slide gate assembly of the container of FIGS. 13 and 14 in a series of positions.
Figure 17:
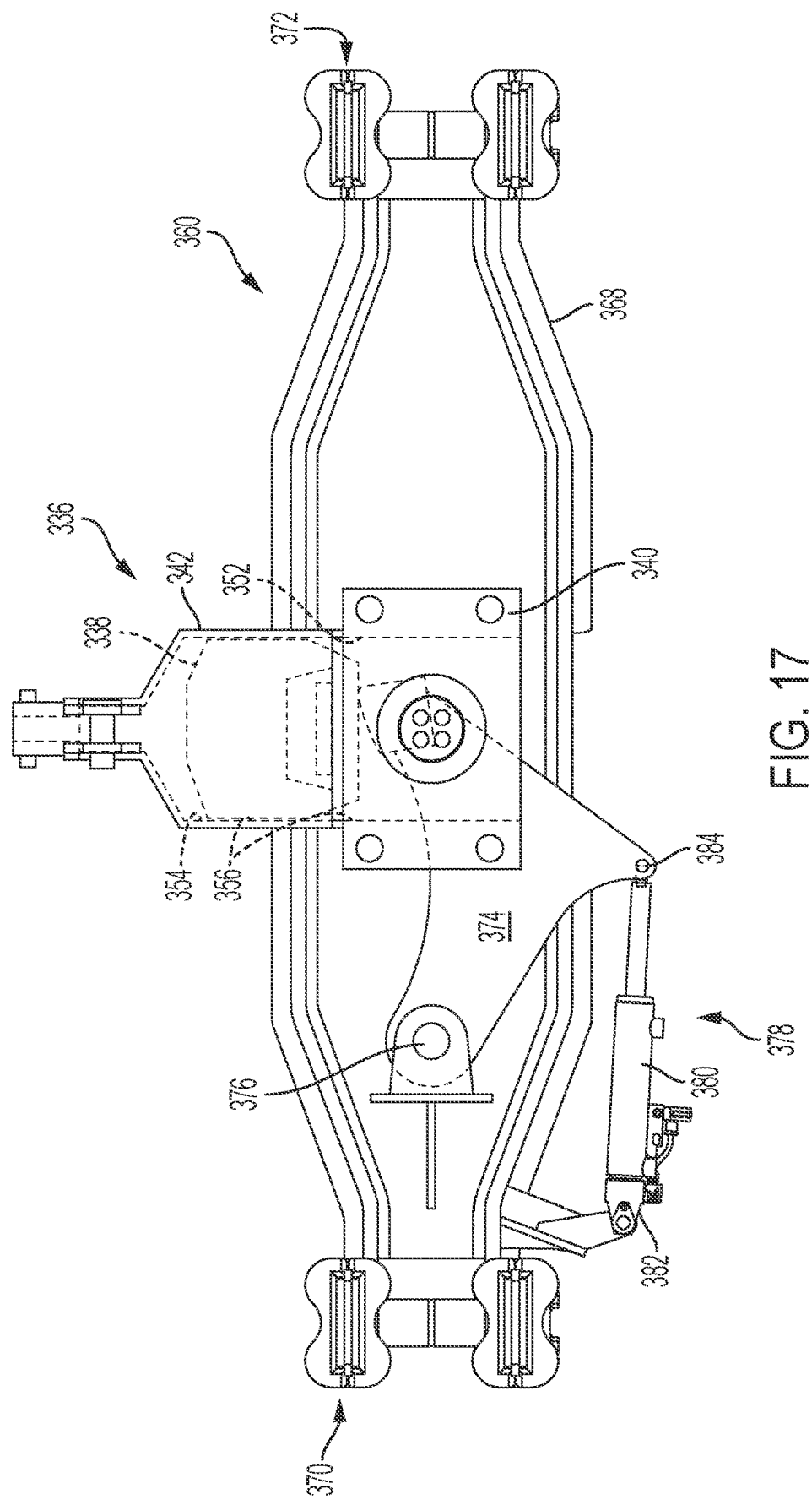
Figure 18:
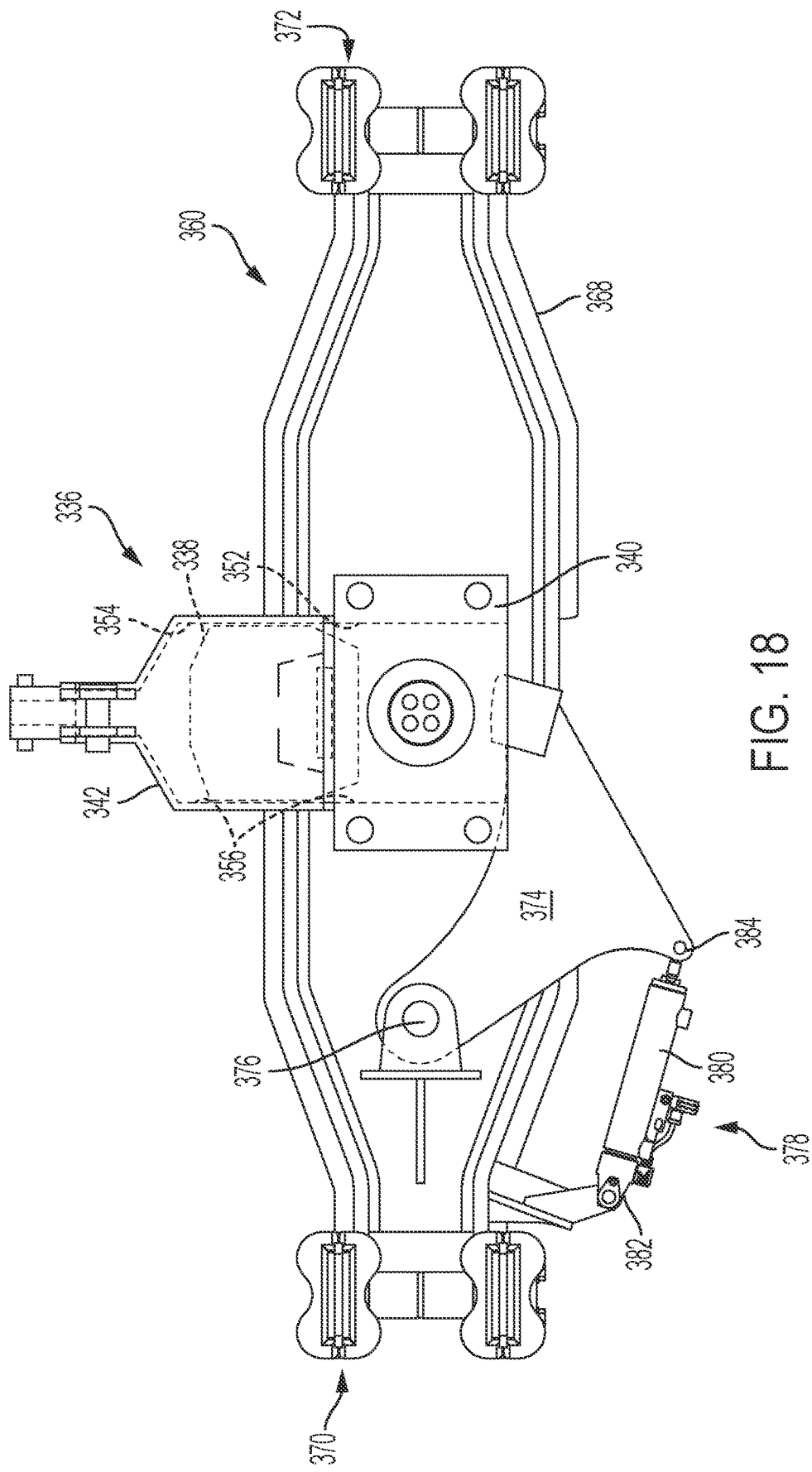

Those of skill in the art will appreciate that the slide gate mechanism cylinder 380 may be extended or retracted to pivot the slide gate actuating arm 374. Referring to FIG. 16, the slide gate 338 is disposed within the guide channel 352 of the slide gate guide 340. In use, when it is desired to uncover the through hole 332 of the container 330, the slide gate mechanism cylinder 380 may be extended to pivot the slide gate actuating arm 374 engage the selectively moveable slide gate 338 disposed within the guide channel 352 of the slide gate guide 340, and push the slide gate 338 into the receiving channel 354 of the slide gate receiver 342, as illustrated in FIG. 17. The slide gate mechanism cylinder 380 may be retracted to pivot the slide gate actuating arm 374 to disengage the selectively moveable slide gate 338, leaving the slide gate 338 disposed within the receiving channel 354 of the slide gate receiver 342, as illustrated in FIG. 18.

Figure 19:
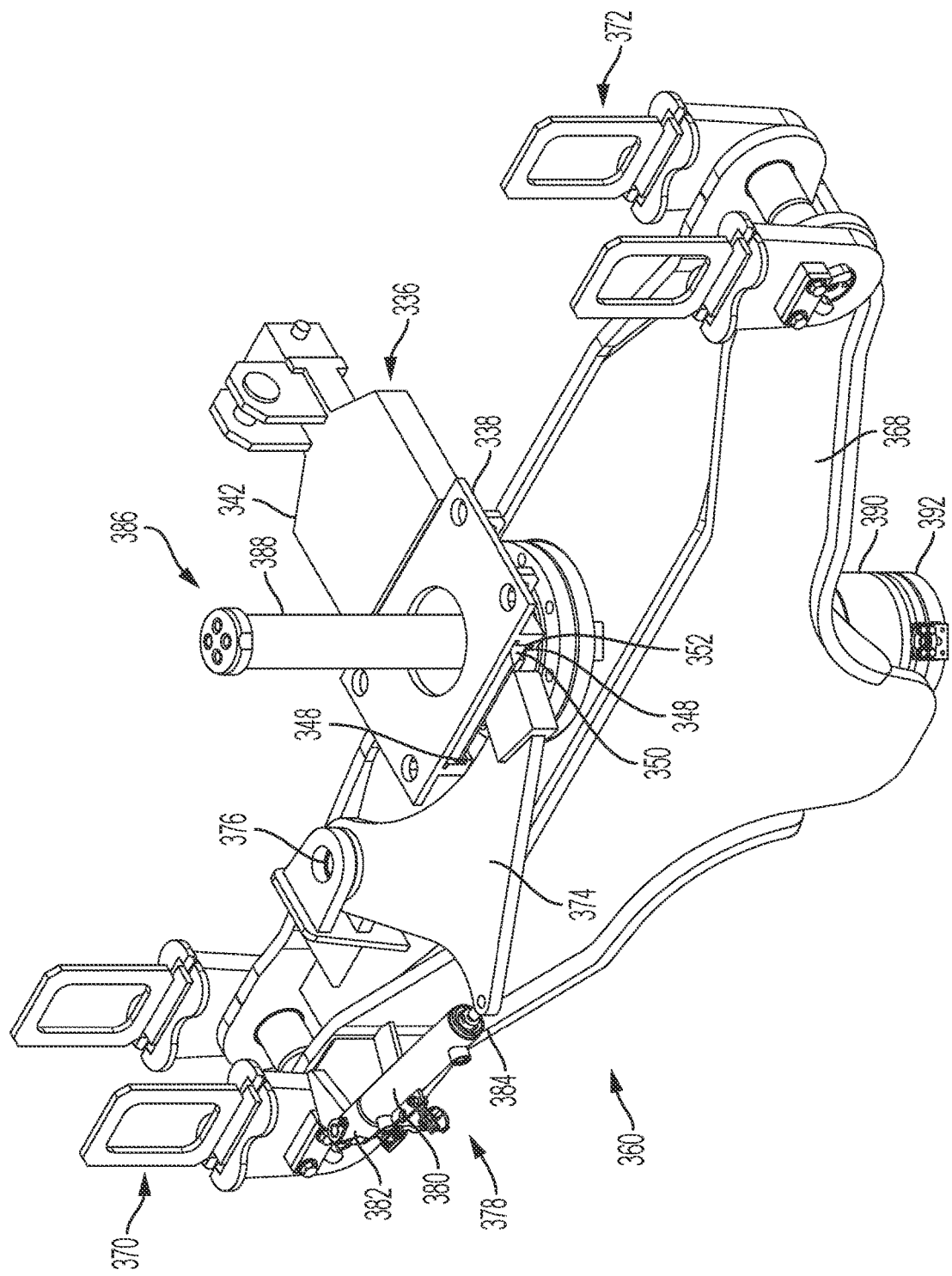
FIG. 19 is a fragmentary, isometric view of the slide gate actuation arrangement and slide gate assembly of FIGS. 16-18.

With both the slide gate 338 and the slide gate actuating arm 374 no longer in alignment with the through hole 332 of the container 330, a pushing assembly 386 may be utilized to dislodge any residual material within the through hole 332 of the container 330. Referring to FIG. 19, for example, a probe 388 may be advance through the through hole 332 by an appropriate source of mechanical movement 390. The source of mechanical movement 390 may be any appropriate arrangement, such as gear train (not illustrated) or a hydraulic cylinder 392. When the probe 388 is then retracted from the through hole 332, the slide gate 338 may be moved to its original position, that is, within the guide channel 352 of the slide gate guide 340, covering the through hole 332 of the container 330 (see FIG. 16).

While the slide gate actuation arrangement 360 may be actuated when the container 330 is in any position, and the pushing assembly 386 may be utilized when container 330 is in any position and the through hole 332 is unobstructed by the slide gate actuating arm 374 or the slide gate 338, in at least one embodiment, the slide gate actuation arrangement 360 may be actuated when the container 330 is in an inverted position (such as the position of the container 276 illustrated in FIG. 11), and the pushing assembly 386 actuated to cause the probe 388 to dislodge any residual material in the through hole 332 during a dumping operation.

Another alternate embodiment of a pallet 400 according to the disclosure is illustrated in FIGS. 20-25. Structure not specifically described with regard to FIGS. 20-25 and an appropriate carrier that may be utilized with the pallet 400 may be the same as or similar to the corresponding structure in FIGS. 1-19. As with the embodiments discussed with regard to FIGS. 1-19, the pallet 400 includes a base 402 and a plurality of supports 404. In the illustrated embodiment, a pair of supports 404 are provided along either side of the base 402.

The pallet 400 further includes a container support arrangement 406, which is illustrated supporting an exemplary container 408. The container support arrangement 406 includes a first platform 410 to which a second platform 412 is pivotably coupled. The exemplary container 408 may be supported on the second platform 412 by any appropriate arrangement, the second platform 412 may be pivotably coupled to the first platform 410 by any appropriate arrangement, and the second platform 412 may be caused to pivot to dump the contents of the exemplary container 408 by any appropriate arrangement, such as, for example, the arrangements illustrated and/or discussed with regard to FIGS. 1-12.

In order to facilitate desired or optimal placement of the container 408 on the base 402, at least one embodiment of this disclosure includes structure to facilitate the rotation and translation of the container support arrangement 406 relative to the base 402. In at least one embodiment, the first platform 410 may include structure for facilitating rotation and translation of the first platform 410 relative to the base 402. As may best be seen in FIG. 21, the first platform 410 includes a rotation frame 414 and a translation frame 416, the container 408 being supported on the translation frame 416.

The rotation frame 414 is supported on the rotatably supported on or with a column 418 extending from the base 402. In the illustrated embodiment, rotation may be imparted to the rotation frame 414 by a cylinder 420 (see FIGS. 24-26). It will be appreciated, however, that rotation may be imparted to the rotation frame 414 by any appropriate arrangement, including, for example, the arrangements discussed with regard to other pallets in this disclosure. In imparting rotation to the rotation frame 414, the first platform 410, second platform 412, and supported container 408 are rotated relative to the base 402 of the pallet 400.

In order to adjust the location of the center of gravity of the container support arrangement 406 and supported container 408, the translation frame 416 may be shifted relative to the rotation frame 414, the translation frame 416 and rotation frame 414 including appropriate structure for providing such relative movement. In the illustrated embodiment, the translation frame 416 includes a cavity or recess 422 in which the rotation frame 414 is disposed. Those of skill in the art will appreciate, however, that alternative structure may be provided to facilitate such relative movement. For example, the translation frame may include structure which engages one or more openings or recesses in the rotation frame.

In order to facilitate such relative movement, at least one side shift cylinder 424 is provided. In at least one embodiment, a pair of side shift cylinders 424 are provided. Those of skill in the art will appreciate that extension or retraction of the rods 426 of the side shift cylinders 424 shifts the location of the translation frame 416 relative to the rotation frame 414.

According to another aspect of the illustrated embodiment, a plurality of translation rollers 428 may be provided to facilitate side shifting of the translation frame 416 relative to the rotation frame 414. In the illustrated embodiment the plurality of translation rollers 428 are coupled to the translation frame 416, and a plurality of tracks 430 are provided along a surface 431 of the base 402, here, an upper surface of the base 402. It will be appreciated, however, that rollers may be alternately disposed, for example on an upper surface of the base 402 such that they may selectively engage with a surface of the translation frame 416. For the purposes of this disclosure, the term "track" includes a surface upon which the translation rollers 428 are to be rolled. The tracks 430 may be nonplanar such that they bias the translation rollers 428 to central positions along the length of the tracks 430.

In the illustrated embodiment, the translation rollers 428 may be selectively engaged with the tracks 430. In the illustrated embodiment, the vertical relationship of the translation frame 416 relative to the rotation frame 414 may be likewise be selectively adjusted to provide selective disengagement of the translation rollers 428 with the tracks 430 during rotation, and engagement of the translation rollers 428 with the tracks 430 during a shifting movement of the translation frame 416 relative to the rotation frame 414.

In order to facilitate rotation of the rotation frame 414 relative to an axis of the column 418, the translation frame 416 and rotation frame 414 may include structure maintains the relative positions between the translation frame 416 and the rotation frame 414, with the plurality of translation rollers 428 disengaged from the tracks 430. In the illustrated embodiment, a plurality of support rollers 432 are disposed along the cavity or recess 422 of the translation frame 416. In order to engage the support rollers 432, a plurality of support arms 434 are provided along peripheral surfaces of the rotation frame 414. When the plurality of support arms 434 are engaged with the plurality of support rollers 432 (see FIG. 21), the relative positons of the translation frame 416 and the rotation frame 414 are substantially fixed. In this position, the translation frame 416 is slightly elevated, with the translation rollers 428 disengaged from the tracks 430. As a result, rotation of the rotation frame 414 is effectively likewise imparted to the translation frame 416. In order to enhance this engagement between the rotation frame 414 and the translation frame 416, the rotation frame 414 further includes a plurality of reinforcement pads 436 disposed to confront the walls of the cavity or recess 422 as the translation frame 416 is raised relative to the rotation frame 414. In this way, the confrontation of the reinforcement pads 436 with the translation frame 416 further steadies the relative positons of the rotation frame 414 and the translation frame 416 during rotation.

Figure 22:
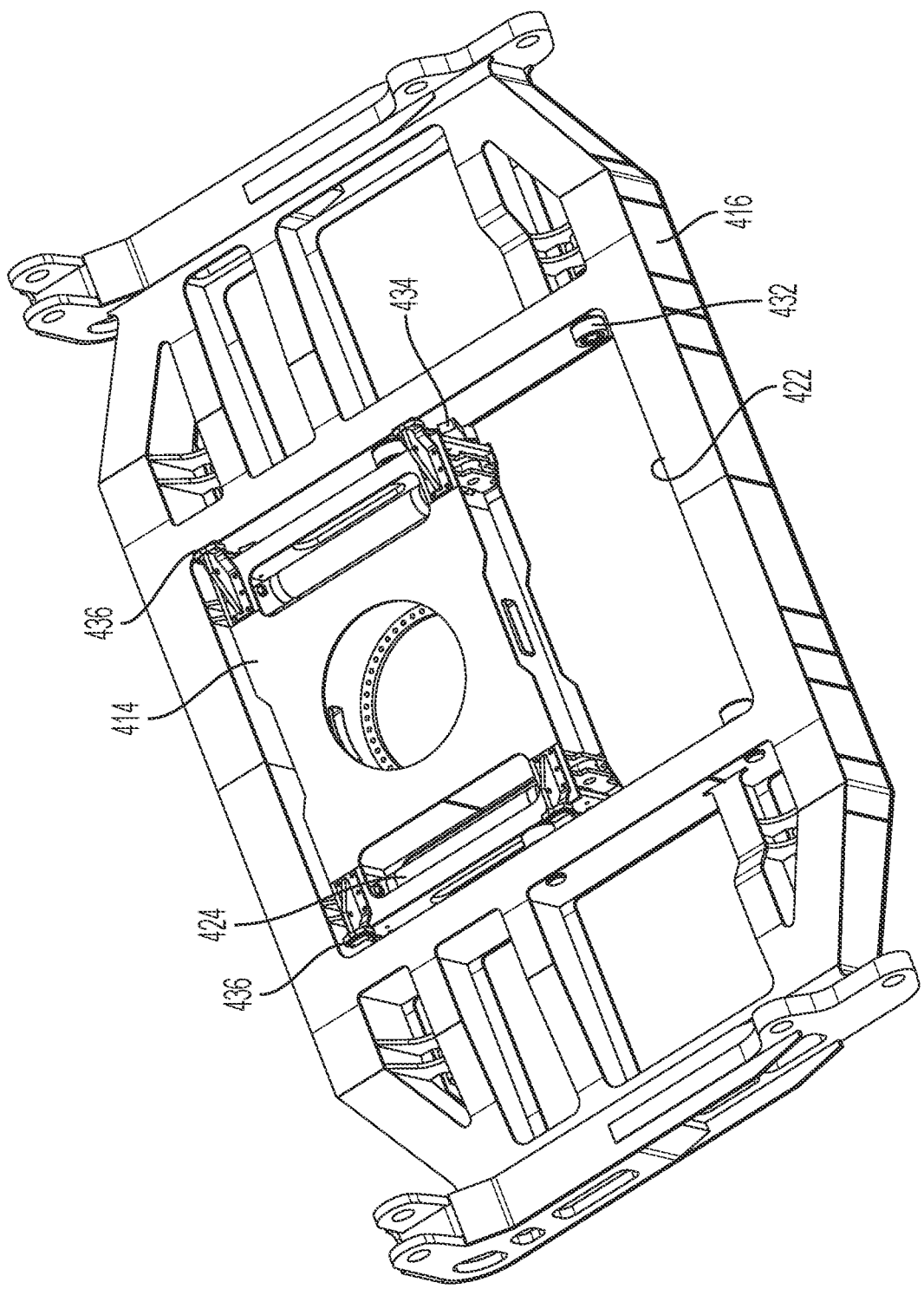
FIG. 22 is an isometric view of the first platform of FIG. 21 illustrating the translation frame in a shifted position relative to the rotation frame.
Figure 23:
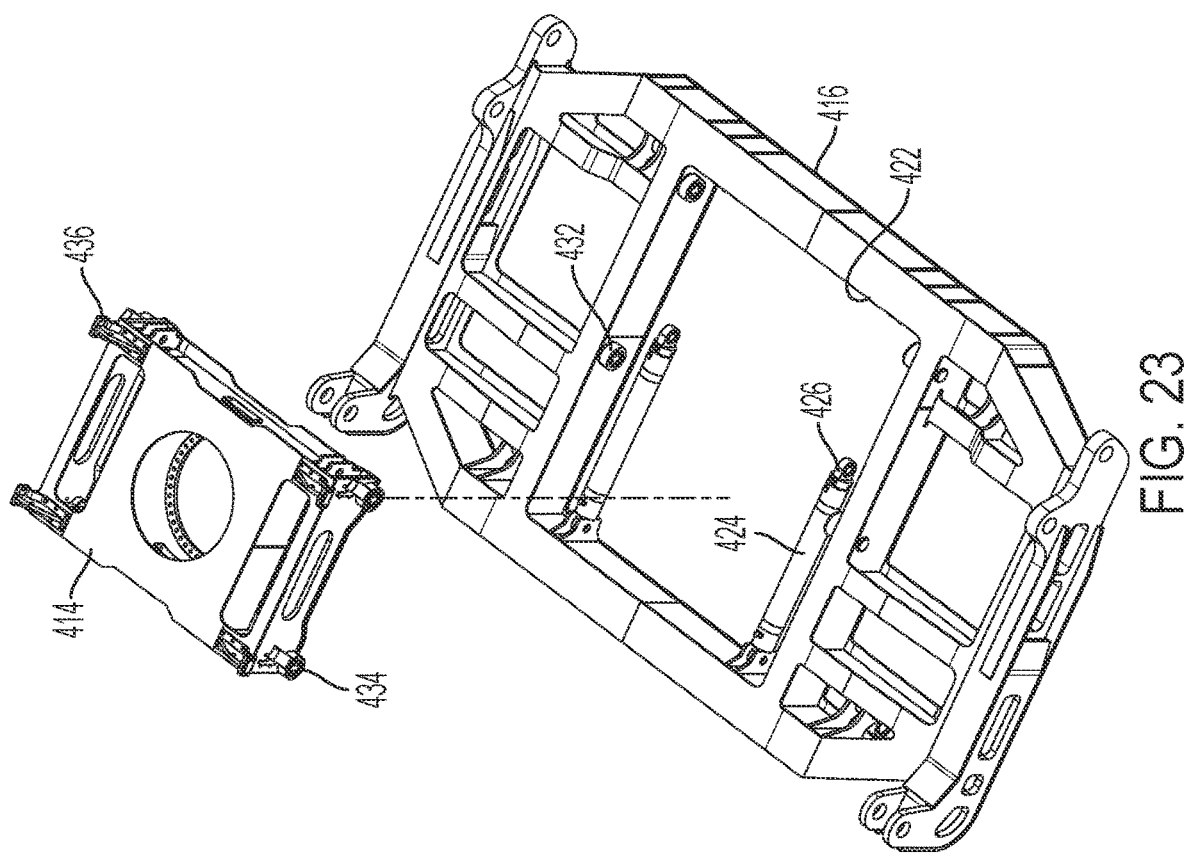
FIG. 23 is an exploded view of the first platform of FIGS. 21 and 22.

Conversely, in order to facilitate translation of the translation frame 416 relative to the rotation frame 414, the side shift cylinders 424 retract to disengage the support arms 434 and support rollers 432 (see FIG. 22). The disengagement permits the translation frame 416 to lower relative to the rotation frame 414, facilitating the engagement of the translation roller 428 with the tracks 430. Further retraction of the side shift cylinders 424 causes the translation frame 416 to shift relative to the rotation frame 414. With the shifting of the translation frame 416 relative to the rotation frame 414, the supported container 408 is likewise shifted. This shifting may permit not only a desirable positioning of the center of gravity of the container support arrangement 406 and supported container 408 along the base 402, but also a desirable positioning of the container support arrangement 406 and supported container 408 for dumping.

Figure 20:
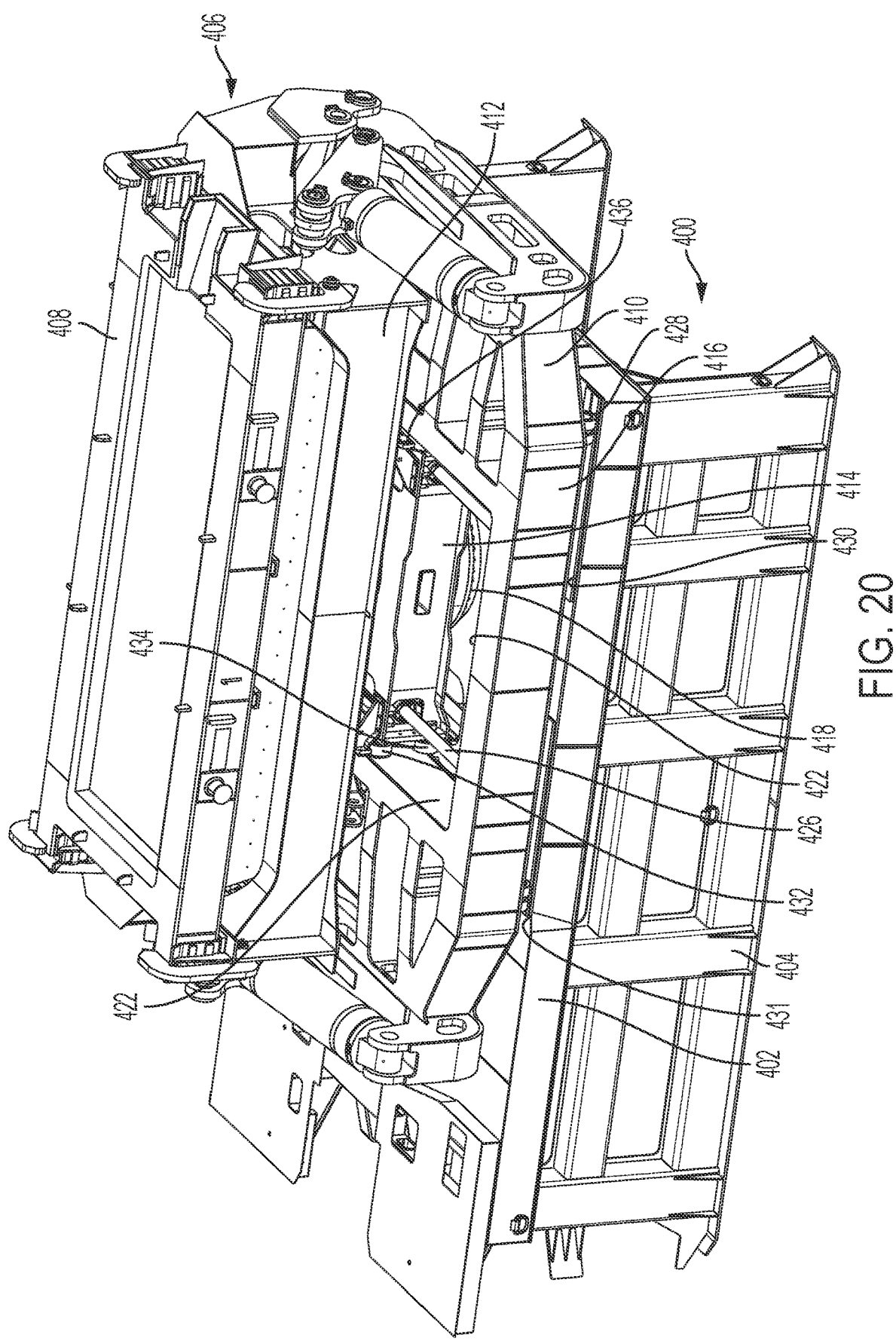
FIG. 20 is an isometric view of an alternative embodiment of a dumping pallet and supported container suitable for use with embodiments of a carrier.
Figure 21:
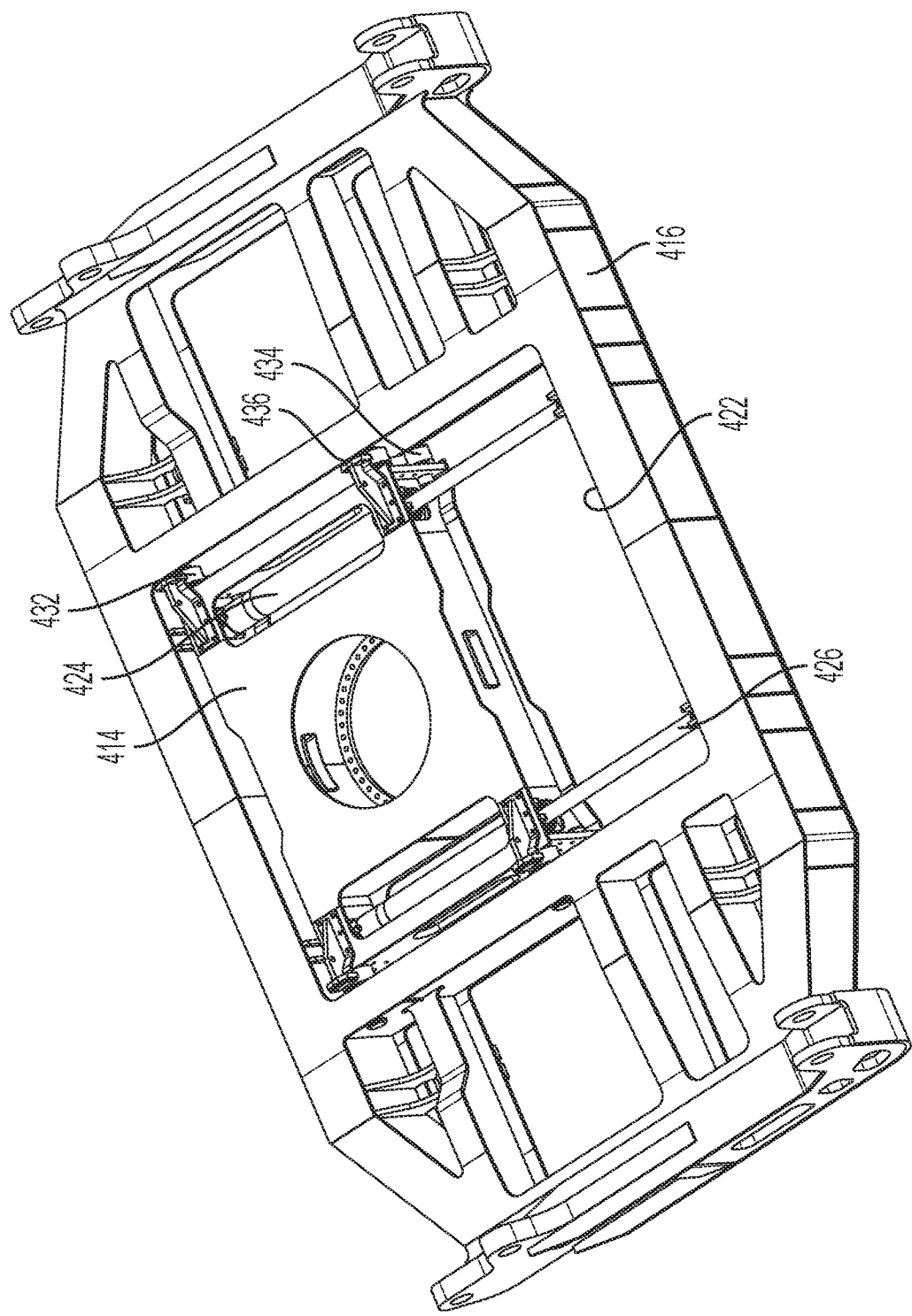
FIG. 21 is an isometric view of a first platform of the dumping pallet of FIG. 20 illustrating a translation frame and a rotation frame of the first platform in a position for rotation.
Figure 24:
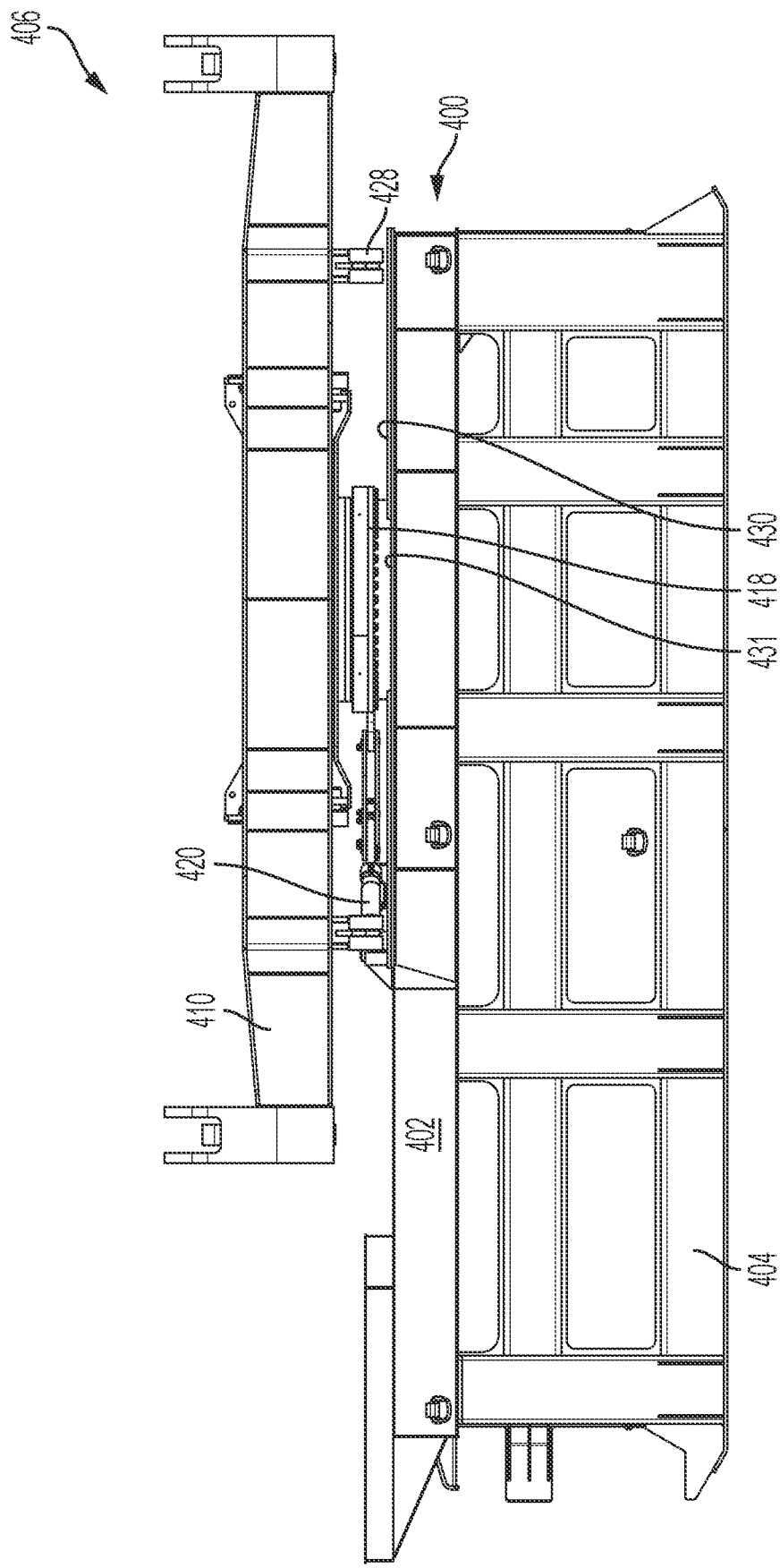
FIG. 24 is a side elevational view of a base supporting the first platform of the dumping pallet of FIG. 20, the first platform being disposed in a transport position.
Figure 25:
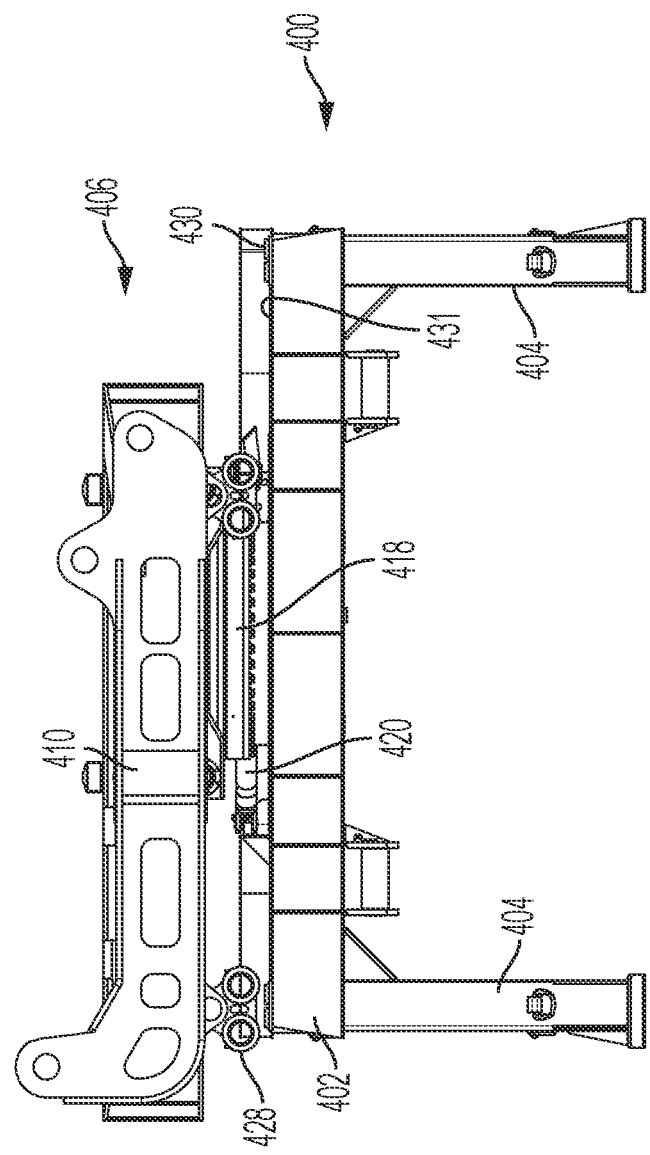
FIG. 25 is an end view of the base and supporting platform of the dumping pallet of FIG. 20, the first platform being disposed in a transport position.
Figure 26:
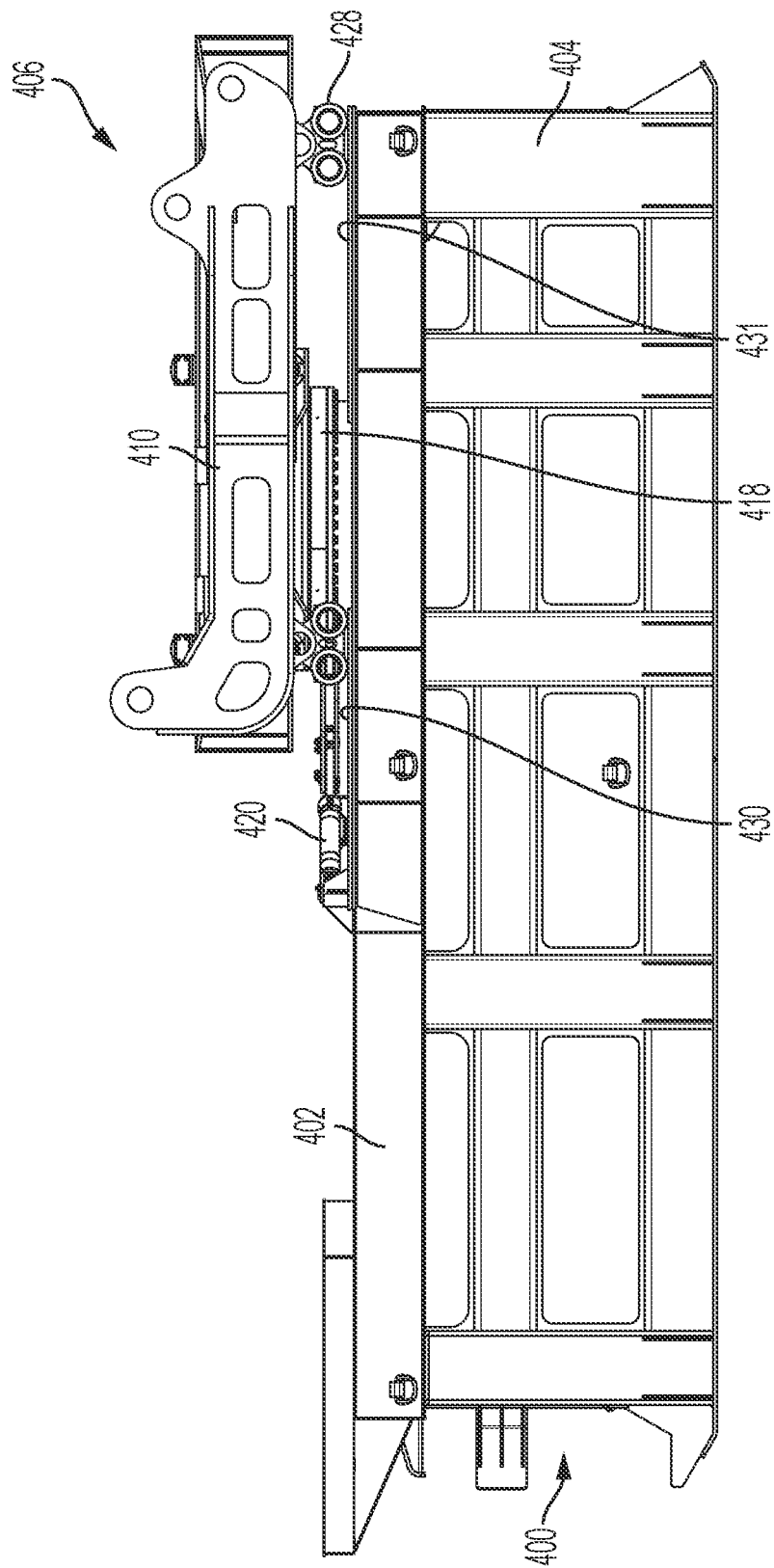
FIG. 26 is a side elevational view of the base supporting the first platform of the dumping pallet of FIG. 20, the first platform being rotated, and translated to a dump position.

Exemplary positioning of the container support arrangement 406 (and, accordingly, a supported container) during both transport and dumping are illustrated in FIGS. 20 and 24-26. In FIGS. 20 and 24-25, the container support arrangement 406 and supported container 408 are illustrated in the transport position. It will be noted that the translation rollers 428 are disengaged from the tracks 430. As illustrated in FIG. 26, in order to facilitate dumping, the rotation frame 414 and translation frame 416 may be rotated to position the container support arrangement 406 and supported container 408 transverse to the base 402. The side shift cylinders 424 may then retract the rods 426 to disengage the support arms 434 and support rollers 432, lowering the translation frame 416 relative to the rotation frame 414, causing the translation rollers 428 to engage the tracks 430. As the side shift cylinders 424 continue to retract rods 426, the translation frame 416 and supported container 408 are shifted rearward on the base 402. The second platform 412 may then be pivoted relative to the first platform 410 to facilitate dumping of the contents of the supported container 408. Following a dumping procedure, the reverse procedure may be performed to return the container support arrangement 406 and supported container 408 to the transport position.

Figure 27:
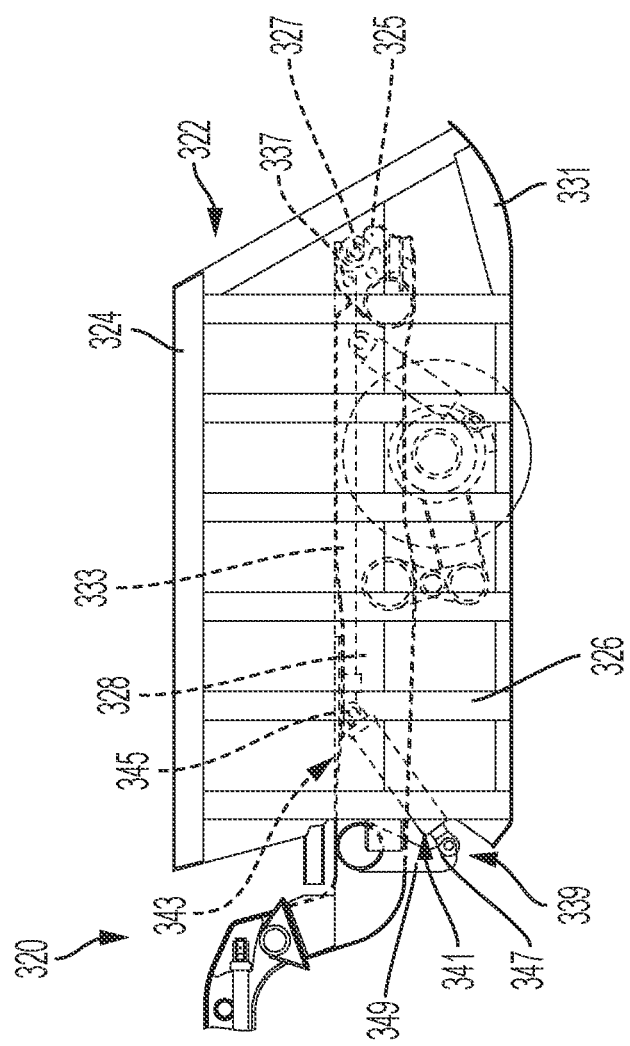
FIG. 27 is a fragmentary side elevational view of the carrier of FIGS. 8-12 supporting a scrap container.

It will further be appreciated that the carrier 104, 210 may additionally be utilized to transport and dump additional types of containers. As illustrated in FIGS. 13 and 14, for example there is illustrated a fragmentary view of a carrier 320, such as the carrier 210, utilized in conjunction with a scrap container 322. Those portions of the carrier 320 not illustrated in FIGS. 27 and 28 may be of any appropriate design, such as, for example, the design illustrated in the carrier 210 of FIGS. 8-12. The scrap container 322 includes, for example, a box 324 for receiving scrap. It will be appreciated that the box 324 may be open at its rear portion. The box 324 is supported by a plurality of supports 326. The plurality of supports 326 extend downward from either side of the box 324, and are spaced apart so that a supporting trailer portion 328 of the carrier 320 may be received between the supports 326. The supports 326 may include ramped or arcuate portions 331 toward a rear of the scrap container 322.

As with the embodiment of FIGS. 8-12, the carrier 320 and container 322 may be provided with appropriate retaining structures. For example, in the illustrated embodiment, one or more cradles 325 are provided near the rear of the supporting trailer portion 328, and one or more cooperating protrusions 327 are provided extending from a lower surface of the box 324.

It will be appreciated that a scrap container 322 may not be required to be pivoted a full 180° in order to expel its contents. A platform 333 of the carrier 320 that is pivotably mounted with the supporting trailer portion 328 at pivot point 337, although alternative or additional pivoting structure may be provided. In order to provide a pivoting force to the platform 333, a platform actuator 339 is provided. In the illustrated embodiment, the platform actuator 339 includes a hydraulic actuator 341 is disposed to engage a portion 343 of the platform 333 opposite the pivot point 337. Hydraulic pressure may be provided to the hydraulic actuator 341 by any appropriate source of hydraulic pressure, such as, for example, a hydraulic fluid tank and pump associated with the transporter 218.

Figure 28:
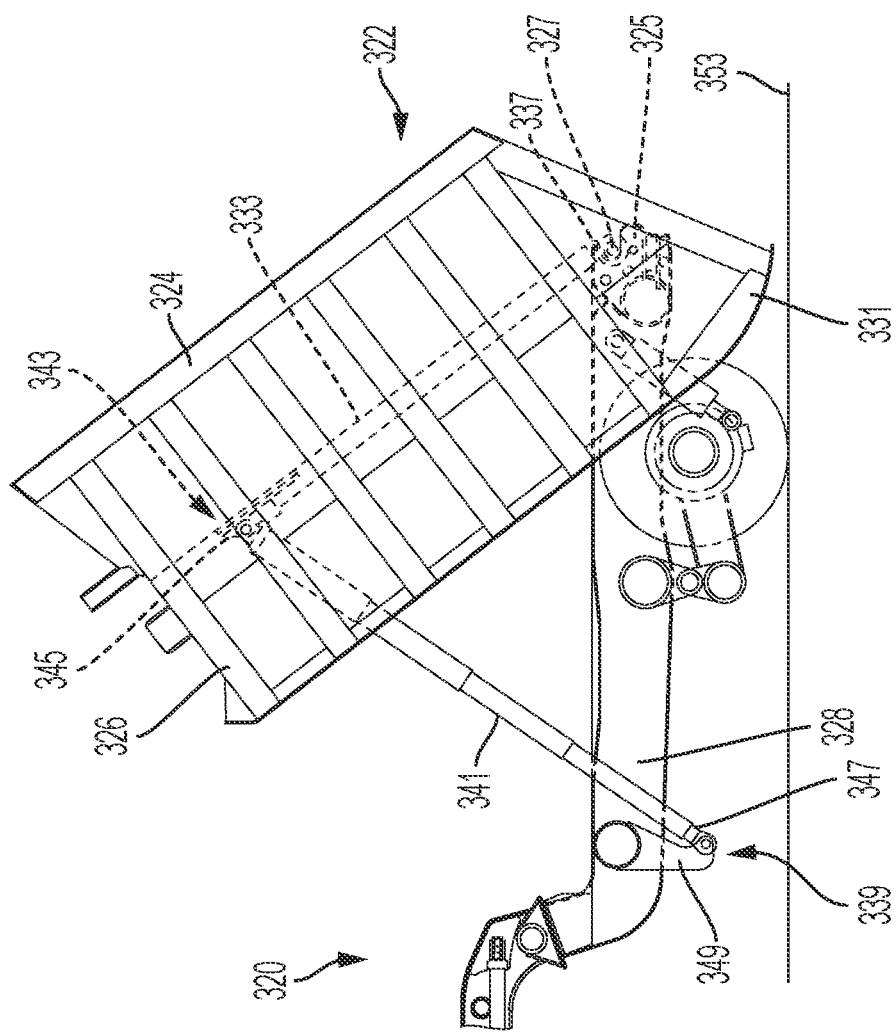
FIG. 28 is a fragmentary side elevational view of the carrier and scrap container of FIG. 27 with the scrap container disposed in a dumping position.

In the illustrated embodiment, opposed ends 345, 347 of the hydraulic actuator 341 are pivotably coupled, respectively, to the platform 333 and to an arm 349 extending downward from the supporting trailer portion 328. In this way, extension or retraction of the hydraulic actuator 341 results in a pivoting movement of the platform 333 relative to the supporting trailer portion 328 and an associated pivoting movement of a supported scrap container 322. In this way, as illustrated in FIG. 28, scrap container 322 seated on a surface 353, the scrap container 322 may be rolled upward on the arcuate portion 331 of the supports 326 in order to empty the contents of the box 324.

While the specific embodiment of the platform actuator 339 described has been a hydraulic actuator 341, those of skill in the art will appreciate that an alternative platform actuator 339 may be provided. By way of example only, the platform actuator 339 may alternatively include a mechanical actuator including a gearing arrangement. Further, while the trailers discussed herein have been described in connection with a tundish and a scrap container, the trailer may be utilized to transport different types of containers as well, such as, for example, a fluid tank.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A pallet for supporting a container on a surface, the pallet comprising:
   a base,
   a plurality of supports secured with the base, the plurality of supports being spaced from one another and supporting the base in spaced relation to the surface, the supports including downwardly extending legs,
   a first platform disposed substantially parallel to the base, the platform being rotatably supported on the base wherein the first platform is substantially parallel to the base during rotation,
   a second platform adapted to support the container, the second platform being pivotably coupled to the first platform for movement between a container transport position and a container dump position, at least one pallet linkage arrangement coupling the second platform and the first platform, the at least one pallet linkage arrangement including a four-bar linkage arrangement, and at least one pallet actuator disposed to pivot the second platform between the container transport position and the container dump position.

2. The pallet of claim 1 further including a plurality of brackets adapted to secure the container to the second platform.

3. The pallet of claim 1 wherein the downwardly extending legs of the plurality of supports include a pair of legs supporting opposite sides of the base.

4. The pallet of claim 3 wherein the pair of legs are U-shaped.

5. The pallet of claim 1 wherein the at least one pallet linkage arrangement includes a first pallet linkage arrangement disposed along a first side of the second platform and a second pallet linkage arrangement disposed along an opposite side of the second platform.

6. The pallet of claim 1 wherein the four-bar linkage arrangement includes the first platform, the second platform, a first pallet link and a second pallet link, the first pallet link being pivotably coupled between the first platform and the second pallet link, and the second pallet link being pivotably coupled between the first pallet link and the second platform.

7. The pallet of claim 1 wherein the at least one pallet actuator includes at least one hydraulic pallet actuator coupled to actuate operation of the at least one pallet linkage arrangement.

8. The pallet of claim 1 further including at least one of a motor, an engine, and a hydraulic pallet actuator adapted to rotate the second platform relative to the base.

9. The pallet of claim 1 further including a power source.

10. The pallet of claim 9 wherein the power source includes at least one of a motor, an engine, and a source of hydraulic pressure.

11. The pallet of claim 1 further including a pushing assembly associated with the second platform, the pushing assembly being adapted to engage the container.

12. The pallet of claim 11 wherein the pushing assembly includes a probe adapted to be advanced toward the container.

13. A pallet for supporting a container on a surface, the pallet comprising:
a base,
a plurality of supports secured with the base, the plurality of supports being spaced from one another and supporting the base in spaced relation to the surface, the supports including downwardly extending legs,
a first platform including a translation frame and a rotation frame, the rotation frame being pivotably coupled to the base and disposed substantially parallel to the base such that the first platform is substantially parallel to the base during rotation, the translation frame being slidably coupled to the rotation frame to shift the translation frame sideways relative to the rotation frame,
a second platform adapted to support the container, the second platform being pivotably coupled to the first platform for movement between a container transport position and a container dump position,
at least one pallet linkage arrangement coupling the second platform and the first platform, and
at least one pallet actuator disposed to pivot the second platform between the container transport position and the container dump position.

14. The pallet of claim 13 wherein the translation frame includes a recess and the rotation frame is at least partially disposed within the recess, the translation frame being slidable within the recess to shift the translation frame sideways relative to the rotation frame.

15. The pallet of claim 13 further including at least one side shift cylinder, the side shift cylinder being disposed and coupled to shift the translation frame sideways relative to the rotation frame.

16. The pallet of claim 13 further including a plurality of rollers coupled to at least one of the translation frame and the base, the translation frame is selectively moveable vertically relative to the rotation frame to selectively engage and disengage the plurality of rollers between the translation frame and the base.

17. The pallet of claim 16 wherein the rotation frame and the translation frame include engageable structure to maintain the translation frame in a raised position with the plurality of rollers disengaged between the translation frame and the base.

18. A pallet for use with a supported container including a bottom surface, the bottom surface including a through hole, the supported container further including a slide gate assembly including a slide gate and a translation channel, the slide gate being movably disposed within the translation channel to selectively cover the through hole along the bottom surface, the pallet comprising:
a base,
a plurality of supports secured with the base, the plurality of supports being spaced from one another and supporting the base in spaced relation to the surface, the supports including downwardly extending legs,
a first platform disposed substantially parallel to the base, the platform being rotatably supported on the base wherein the first platform is substantially parallel to the base during rotation,
a second platform adapted to support the container, the second platform being pivotably coupled to the first platform for movement between a container transport position and a container dump position,
at least one pallet linkage arrangement coupling the second platform and the first platform,
at least one pallet actuator disposed to pivot the second platform between the container transport position and the container dump position, and
a slide gate actuation arrangement selectively actuable to translate the slide gate within the translation channel to uncover the through hole.

19. The pallet of claim 18 wherein the slide gate actuation arrangement includes a slide gate actuating arm and a slide gate arm actuator coupled to the second platform, the slide gate actuating arm being pivotably coupled to the second platform, the slide gate arm actuator being selectively actuable to pivot the slide gate actuating arm into engagement with the slide gate and out of engagement with the slide gate.

20. The pallet of claim 19 wherein the slide gate actuation arrangement further includes a support bracket coupled to the second platform, the slide gate actuating arm and the slide gate arm actuator being coupled to the support bracket.

21. The pallet of claim 18 further including a pushing assembly including a probe and a source of mechanical power, the probe being disposed to selectively engage the through hole when actuated by the source of mechanical power.

22. An arrangement for transporting a container on a surface, and dumping the container, the arrangement comprising:

a pallet including
   a base,
   a plurality of supports secured with the base, the plurality of supports being spaced from one another and supporting the base in spaced relation to the surface, the supports including downwardly extending legs,
   a first platform disposed substantially parallel to the base, the platform being rotatably supported on the base wherein the first platform is substantially parallel to the base during rotation,
   a second platform adapted to support the container, the second platform being pivotably coupled to the first platform for movement between a container transport position and a container dump position,
   at least one pallet linkage arrangement coupling the second platform and the first platform, and
   at least one pallet actuator disposed to pivot the second platform between the container transport position and the container dump position, and
a carrier, the carrier including
   a trailer, at least a portion of the trailer being sized to be received between the plurality of supports secured with the base,
   a plurality of ground engaging members,
   at least one carrier actuator adapted to move at least a portion of the trailer between a lowered position and a raised support position relative to at least a portion of the plurality of ground engaging members, and
   a prime mover.

23. The arrangement of claim 22 wherein the at least one carrier actuator includes at least one carrier linkage arrangement and at least one hydraulic actuator.

24. The arrangement of claim 22 wherein the carrier further includes a transporter having the prime mover disposed with the transporter, the trailer being coupled to the transporter at a hitch.

25. The arrangement of claim 24 wherein the plurality of ground engaging members include a first plurality of ground engaging members supporting the trailer and a second plurality of ground engaging members supporting the transporter, and wherein the at least one carrier actuator includes at least a first carrier linkage arrangement coupling the trailer to the first plurality of ground engaging members supporting the trailer and a first carrier hydraulic actuator disposed to move the trailer between a lowered position and a raised support position relative to the first plurality of ground engaging members supporting the trailer and cause movement of the first carrier linkage arrangement.

26. The arrangement of claim 25 wherein the hitch includes at least one carrier linkage arrangement, and the at least one carrier actuator further a second carrier linkage arrangement disposed substantially adjacent the hitch and a second carrier hydraulic actuator disposed to move the second carrier linkage arrangement between a lowered hitch position and a raised hitch position.

27. The arrangement of claim 22 wherein the trailer further includes a pivotably mounted platform.

28. The arrangement of claim 22 further including a pushing assembly associated with the second platform, the pushing assembly being adapted to engage the container.

29. The arrangement of claim 28 wherein the pushing assembly includes a probe adapted to be advanced toward the container.

30. A pallet for supporting a container on a surface and for being transported by a carrier including a trailer, a plurality of ground engaging members, at least one carrier actuator adapted to move at least a portion of the trailer between a lowered position and a raised support position relative to at least a portion of the plurality of ground engaging members, and a prime mover, the pallet comprising:
   a base,
   a plurality of supports secured with the base, the plurality of supports being spaced from one another and supporting the base in spaced relation to the surface, the supports including downwardly extending legs, at least a portion of the trailer being sized to be removably received between the plurality of supports secured with the base,
   a first platform disposed substantially parallel to the base, the platform being rotatably supported on the base wherein the first platform is substantially parallel to the base during rotation,
   a second platform adapted to support the container, the second platform being pivotably coupled to the first platform for movement between a container transport position and a container dump position,
   at least one pallet linkage arrangement coupling the second platform and the first platform, and
   at least one pallet actuator disposed to pivot the second platform between the container transport position and the container dump position.

* * * * *